(12) United States Patent  
Kasianova et al.

(10) Patent No.: US 8,512,824 B2
(45) Date of Patent: Aug. 20, 2013

(54) COMPOSITION OF ORGANIC COMPOUNDS, OPTICAL FILM AND METHOD OF PRODUCTION THEREOF

(75) Inventors: Irina Kasianova, Moscow Region (RU); Ellina Kharatiyan, Moscow (RU)

(73) Assignee: Crysoptix KK, Tokyo (JP)

( * ) Notice: Subject to any disclaimer, the term of this patent is extended or adjusted under 35 U.S.C. 154(b) by 601 days.

(21) Appl. No.: 12/541,362

(22) Filed: Aug. 14, 2009

(65) Prior Publication Data

US 2010/0085521 A1 Apr. 8, 2010

Related U.S. Application Data

(60) Provisional application No. 61/174,451, filed on Apr. 30, 2009, provisional application No. 61/103,914, filed on Oct. 8, 2008, provisional application No. 61/089,911, filed on Aug. 19, 2008.

(51) Int. Cl.
| | |
|---|---|
| *G02B 5/30* | (2006.01) |
| *C09K 19/32* | (2006.01) |
| *C09K 19/12* | (2006.01) |
| *C09K 19/20* | (2006.01) |
| *C09K 19/54* | (2006.01) |
| *G02F 1/1335* | (2006.01) |
| *G02F 1/1337* | (2006.01) |

(52) U.S. Cl.
USPC ... 428/1.31; 428/1.1; 252/299.5; 252/299.62; 252/299.66; 252/299.67; 349/117; 349/118; 349/130

(58) Field of Classification Search
USPC .................. 428/1.1, 1.31; 252/299.01, 299.5, 252/299.62, 299.66, 299.67; 349/117, 118, 349/130
See application file for complete search history.

(56) References Cited

U.S. PATENT DOCUMENTS

| | | | |
|---|---|---|---|
| 5,132,147 | A | 7/1992 | Takiguchi et al. |
| 5,739,296 | A | 4/1998 | Gvon et al. |

(Continued)

FOREIGN PATENT DOCUMENTS

| | | | |
|---|---|---|---|
| WO | 03104242 | A2 | 12/2003 |

OTHER PUBLICATIONS

Yang et al., "Self-assembling structure in solution of a semirigid polyelectrolyte," Macromolecules, Feb. 12, 2008, 41(5), pp. 1791-1799.

(Continued)

*Primary Examiner* — Shean C Wu
(74) *Attorney, Agent, or Firm* — Houst Consulting

(57) ABSTRACT

A composition includes at least one organic compound of a first type of the general formula I and at least one organic compound of a second type of the general structural formula II, wherein Core in formula I is a conjugated organic unit capable of forming a rigid rod-like macromolecule, Gk is a set of ionogenic side-groups providing solubility of the organic compound of the first type in a solvent and give rigidity to the rod-like macromolecule; and wherein Sys in formula II is an at least partially conjugated substantially planar polycyclic molecular system capable of forming board-like supramolecules via π-π-interaction, and X, Y, Z and Q are substituents. The composition is capable of forming a lyotropic liquid crystal solution, which can form a solid retardation layer of biaxial type substantially transparent to electromagnetic radiation in the visible spectral range. The type and degree of biaxiality of the said optical retardation layer is controlled by a molar ratio of the organic compounds of the first and the second type in the composition. An optical film comprising a solid retardation layer formed of the composition, a method of producing the optical film, and a vertical alignment liquid crystal display using said retardation layer are also provided.

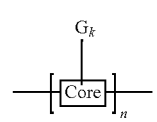

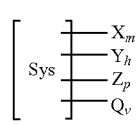

36 Claims, 18 Drawing Sheets

(56) References Cited

U.S. PATENT DOCUMENTS

| | | | |
|---|---|---|---|
| 8,142,863 B2* | 3/2012 | Palto | 428/1.1 |
| 2004/0146663 A1 | 7/2004 | Paukshto et al. | |
| 2004/0215015 A1 | 10/2004 | Nazarov et al. | |
| 2012/0013982 A1* | 1/2012 | Kharatiyan | 359/489.07 |
| 2012/0081784 A1* | 4/2012 | Lazarev | 359/489.07 |

OTHER PUBLICATIONS

Funaki et al., "Shear-induced mesophase organization of polyanionic rigid rods in aqueous solution," Langmuir, 2004, vol. 20, pp. 6518-6520.

Sarkar et al., "Rigid rod water-soluble polymer," Applied Polymer Science, 1996, vol. 62, pp. 393-408.

Vandenberg et al., "The synthesis and solution properties of some rigid-chain, water-soluble polymers: Poly[ N, N'-( Sulfo-Phenylene)phthalamide]s and Poly[ N,N'-( Sulfo-p-Phenylene)pyromellitimide]," J. of Polymer Science: Part A: Polymer Chemistry, 1989, vol. 27, pp. 3745-3757.

Yeh et al., "Optics of Liquid Crystal Displays," John Wiley & Sons, New York, 2010.

Lazarev et al., "Thin Crystal Film Retarders," Proceeding of the 7th International Display Workshops, Materials and Components, Kobe, Japan, Nov. 29-Dec. 1, 2000, pp. 1159-1160.

Mendes et al., "Triggering liquid crystallinity in water-soluble rigid-rod polymers via electrostatics," Proc. Symp. On Functional Polymer Materials, 2004, 1page.

Passmann et al., "Nematic Ionomers as Materials for the Build-up of Multilayers," Macromolecular Chemistry and Physics, Wiley-VCH Verlag, Weinheim, DE, 1997, vol. 199 (2), 179-189.

Bahadur, "Liquid Crystals—Applications and Uses," vol. 1, p. 101, World Scientific, Singapore—New York, 1990.

Broer et al. "New Functional Polymers for Liquid Crystal Displays Review of Some Recent Developments," Macromol. Symp. 2000, 154, pp. 1-13.

PCT, International Search Report and Written Opinion in International Application No. PCT/IB2009/053602, Feb. 5, 2010, 12 pages.

* cited by examiner

COMPOSITION OF ORGANIC COMPOUNDS, OPTICAL FILM AND METHOD OF PRODUCTION THEREOF

FIELD OF THE INVENTION

The present invention relates generally to the field of organic chemistry and particularly to the optical retardation films with biaxial properties for liquid crystal displays.

BACKGROUND OF THE INVENTION

The liquid crystal display (LCD) technology has made considerable progress in the past years. There are a lot of TV sets, monitors and even public displays based on LCD panels on the market. The market of LCD is expected to keep growing in the near future.

The rapidly growing and changing market sets new tasks for researchers and manufacturers. Growing size of LCD diagonal, which has already exceeded 100 inch size, imposes stronger restrictions onto the quality of optical components. In case of retardation films, very small color shift and ability to provide higher contrast ratio at wide viewing angles are required for high-quality viewing of large displays.

Nowadays there are still some disadvantages of LCD technology which impact the quality of liquid crystal displays and still make feasible the competitive technologies like plasma display panel (PDP) in large-size and cathode-ray tube (CRT) in mid-size displays. One of disadvantages is a decrease of contrast ratio at oblique viewing angles. In conventional LCD the viewing angle performance is strongly dependent upon polarizers' performance. Typical LCD comprises two dichroic polarizers crossed at 90°. However, at oblique angles the angle between projections of their axes deviates from 90°, and polarizers become uncrossed. The light leakage increases with increasing off-axis oblique angle. This results in low contrast ratio at wide viewing angle along the bisector of crossed polarizers. Moreover, generally the light leakage becomes worse because of the liquid crystal cell placed between crossed polarizers.

Off-axis contrast drop issue in LCD can be successfully solved using phase retardation films, which represent optically anisotropic materials. In particular, biaxial retardation films which have three different principal refractive indices can be used for optical compensation of LCD. In contrast with uniaxial retardation films, the biaxial retardation films generally allow providing the best compensation effect using minimal number of compensating sheets.

Phase retardation optical films used for improvement of the LCD contrast at wide viewing angles are known in the art. Most of the conventional phase retardation films are produced by stretching of polymers such as polycarbonate, polyester, polynorbornene etc. Depending on the type of the stress employed on the polymeric film, it is possible to obtain uniaxial or biaxial retardation films of various types. However, the improvement of its performance is difficult due to limitations of the stretching manufacturing process.

Besides the stretching of the amorphous polymeric films, other polymer alignment techniques are known in the art. Thermotropic liquid crystalline polymers (LCP) can provide highly anisotropic films characterized by various types of birefringence. The production of such films comprises coating a polymer melt or solution on a substrate; for the latter case the coating is followed by the solvent evaporation. The additional alignment actions are involved, such as an application of the electric field, using of the alignment layer or coating onto a stretched substrate. The after-treatment of the coating is at a temperature at which the polymer exhibits liquid crystalline phase and for a time sufficient for the polymer molecules to be oriented. Examples of uniaxial and biaxial optical films production can be found in U.S. Pat. No. 5,132,147, and other patent documents and scientific publications.

Optical films can be also produced by coating of lyotropic liquid crystalline (LLC) solutions based on low-molecular compounds capable of forming columnar supramolecules as also known as chromonics. Extensive investigations aimed at developing new methods of fabricating chromonic-based films through variation of the film deposition conditions have been described in U.S. Pat. No. 5,739,296 and other patent documents and scientific publications. Of particular interest is the development of new compositions of lyotropic liquid crystals utilizing modifying, stabilizing, surfactant and/or other additives in the known compositions, which improve the characteristics of the films. The recent research has been directed to the materials used in the manufacturing of anisotropic films, polarizers and retarders for LCD and telecommunications applications, such as (but not limited to) those described in P. Yeh, Optical Waves in Layered Media, New York, John Wiley &Sons (1998), and P. Yeh, and C. Gu, Optics of Liquid Crystal Displays, New York, John Wiley &Sons, (1999).

It has been shown that ultra-thin optically anisotropic birefringent films based on organic dye LLC systems can be produced using the known methods and technologies. In particular, manufacturing of thin crystalline optically anisotropic films based on disulfoacids of dibenzimidazoles of naphthalenetetracarboxylic acid has been described by P. Lazarev and M. Paukshto (in: Proceedings of 7th IDW, (2000), pp. 1159-1160). In the above referenced films the molecules are packed with their minimal polarizability axis parallel to the film coating direction. This structure allows to produce uniaxial −A-plate or biaxial $B_A$-plate retardation film types.

Water soluble rigid-rod polymers are also known to exhibit self-assembled structures in aqueous solutions. Such polymers are used as model objects which are able to reveal some mechanisms taking place in living organisms and implying natural rigid-rod polymers such as deoxyribonucleic acid (DNA), proteins, polysaccharides, having great abilities to form well-ordered structures by spontaneous self-assembly, which is fundamental to invoke their biological functions. As natural rigid-rod polyelectrolytes are difficult to extract without denaturation, synthetic analogues can be studied to investigate some aspects of polyelectrolites aggregation in aqueous solutions. For example, self-assembling properties of water-soluble poly(2,2'-disulfonylbenzidine terephtalamide (PBDT) were investigated by W. Yang et al. (*Macromolecules*, 41 (5), 1791-1799, 2008). The authors investigated the PBDT sodium salt in different concentration regions. It was shown that at concentration exceeding 3 wt. % the PBDT molecules can form liquid crystalline state. The investigation of electrolyte effect has also shown that adding of the salt (NaCl) enhances the association processes in the PBDT solutions.

Shear-induced mesophase organization of synthetic polyelectrolytes in aqueous solution was described by T. Funaki et al. in *Langmuir*, 2004, val. 20, 6518-6520. Poly(2,2'-disulfonylbenzidine terephtalamide (PBDT) was prepared by an interfacial polycondensation reaction according to the procedure known in the prior art. Using polarizing microscopy, the authors observed lyotropic nematic phase in aqueous solutions in the concentration range of 2.8-5.0 wt %. Wide angle X-ray diffraction study indicated that in the nematic state the PBDT molecules show an inter-chain spacing, d, of 0.30-0.34 nm, which is constant regardless of the concentration (2.8-5.0 wt %). The d value is smaller than that of the ordinary nematic polymers (0.41-0.45 nm), suggesting that PBDT rods in the nematic state have a strong inter-chain interaction in the nematic state to form the bundle-like structure despite the electrostatic repulsion of sulfonate anions. In the concentration range from 2 to 2.8 wt % a shear-induced birefringent (SIB) mesophase was observed.

A number of rigid rod water-soluble polymers were described by N. Sarkar and D. Kershner in Journal of Applied Polymer Science, Vol. 62, pp. 393-408 (1996). The authors suggest these polymers for different applications such as enhanced oil recovery. For these applications, it is essential to have a water soluble shear stable polymer that can possess high viscosity at very low concentration. It is known that rigid rod polymers can be of high viscosity at low molecular weight compared with the traditionally used flexible chain polymers such a hydrolyzed poly-acrylamides. New sulfonated water soluble aromatic polyamides, polyureas, and polyimides were prepared via interfacial or solution polymerization of sulfonated aromatic diamines with aromatic dianhydrides, diacid chlorides, or phosgene. Some of these polymers had sufficiently high molecular weight (<200,000 according to GPC data), extremely high intrinsic viscosity (~65 dL/g), and appeared to transform into a helical coil in salt solution. These polymers have been evaluated in applications such as thickening of aqueous solutions, flocculation and dispersion stabilization of particulate materials, and membrane separation utilizing cast films.

Synthesis and properties of solutions of water-soluble polyamides are described by E. J. Vandenberg, W. R. Diveley, et al. in Journal of Polymer Science: Part A: Polymer Chemistry, Vol. 27, pp. 3745-3757 (1989). Poly[N,N'-(sulfo-phenylene)phthalamidles and poly[N,N'-(sulfo-p-phenylene)pyromellitimidel were prepared in water-soluble form and it was found that their solution demonstrate unique properties, in some respects similar to xanthan. The most investigated polymer, poly[N,N'-(sulfo-p-phenylene)terephthalamide] (PPT-S), was produced as the dimethylacetamide (DMAC) salt by the solution polymerization of 2,5-diaminobenzenesulfonic acid with terephthaloyl chloride in DMAC containing LiCl. The isolated polymer requires heating to be dissolved in water; the resulting solutions are viscous solutions or gels at concentrations as low as 0.4%. They are highly birefringent, exhibit circular dichroism properties, and are viscosity-sensitive to the content of salt. Solutions of this polymer mixed with those of guar or hydroxyethyl cellulose give significantly enhanced viscosity. The polymer has a relatively low molecular weight, ca. 5000, as estimated from the viscosity data. Some meta- and para-isomeric analogs of PPT-S were prepared; these polymers have similar properties except they are more soluble in water, and higher concentrations are required to obtain significant viscosity. Poly[N,N'-(sulfo-p-phenylene) pyromellitimide] (PIM-S) was prepared similarly from 2,5-diaminobenzenesulfonic acid and pyromellitic dianhydride. Properties of its aqueous solutions are similar to those of PPT-S. It appears that these relatively low-molecular-weight rigid-chain polymers associate in water to form a network that results in viscous solutions at low concentrations.

Self-assembling properties of sulfonated poly-paraphenylene terephthalamides were considered as a function of number and relative position of sulfonic groups to the main chain by E. Mendes, S. Viale, and S. J. Picken in *Proc. Symp. on Functional Polymer Materials*, 2004. The authors report, that when the repeated unite contains only one sulfonic group, the structure of the aqueous solutions vary from gel in case of poly(sulfo-paraphenylene terephtalamide) to supramolecular nematic liquid crystal in the case of poly(paraphenylene sulfoterephthalamide). Thus the position of the sulfonic group dramatically affects the structure of the solutions. When two sulfonic groups are present in the repeating unit (in case of poly(sulfo-paraphenylene sulfoterephthalamide)), a molecular polyelectrolyte lyotropic liquid crystal is formed.

The present invention provides solutions to the above referenced disadvantages of the optical films for liquid crystal display or other applications, and discloses a new type of optical film, in particular a biaxial retardation layer.

SUMMARY OF THE INVENTION

The present invention provides a composition comprising at least one organic compound of a first type, and at least one organic compound of a second type, wherein the organic compound of the first type has a general structural formula I

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and wherein the organic compound of the second type has a general structural formula II

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide —CONH$_2$, substituent Q is a sulfonamide —SO$_2$NH$_2$, and m, h, p, v are 0, 1, 2, 3, or 4, the organic compound of the second type is capable of forming board-like supramolecules via π-π-interaction; the composition of the above described compounds or their salts is capable of forming a lyotropic liquid crystal solution; and the solution is capable of forming a solid retardation layer substantially transparent to electromagnetic radiation in the visible spectral range.

In a further aspect, the present invention provides an optical film comprising a substrate having front and rear surfaces, and at least one solid retardation layer on the front surface of the substrate, wherein the solid retardation layer comprises at least one organic compound of the first type and at least one organic compound of the second type, wherein the organic compound of the first type has a general structural formula I

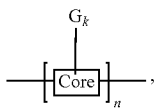

(I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and wherein the organic compound of the second type has a general structural formula II

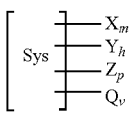

(II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide —CONH$_2$, substituent Q is a sulfonamide —SO$_2$NH$_2$, and m, h, p, v are 0, 1, 2, 3, or 4, wherein the organic compound of the second type is capable of forming board-like supramolecules via π-π-interaction. The solid optical retardation layer is substantially transparent to electromagnetic radiation in the visible spectral range.

In yet further aspect, the present invention provides a method of producing an optical film, comprising the steps of
a) preparation of a lyotropic liquid crystal solution of a composition comprising at least one organic compound of a first type, and at least one organic compound of a second type, wherein the organic compound of the first type has a general structural formula I

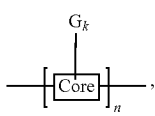

(I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; and the number n provides molecule anisotropy that promotes self-assembling of the macromolecules in a solution of the organic compound or its salt, and wherein the organic compound of the second type has a general structural formula II

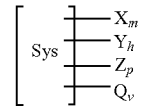

(II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide, substituent Q is a sulfonamide, and m, h, p, v are 0, 1, 2, 3, or 4, wherein the organic compound of the second type is capable of forming board-like supramolecules via π-π-interaction; and wherein the composition of the organic compounds of the first and the second type or their salts is capable to form a lyotropic liquid crystal solution;
b) application of a liquid layer of the solution onto a substrate, wherein the liquid layer is substantially transparent to electromagnetic radiation in the visible spectral range;
c) application of an external alignment action onto said liquid layer; and
d) drying to form a solid optical retardation layer.

In still further aspect, the present invention provides a liquid crystal display comprising a vertical alignment mode liquid crystal cell, two polarizers arranged on each side of the liquid crystal cell, and at least one compensating structure located between said polarizers, wherein the polarizers have transmission axes which are perpendicular to each other, and the compensating structure comprises at least one retardation layer, wherein the retardation layer comprises at least one organic compound of the first type and at least one organic compound of the second type, wherein the organic compound of the first type has a general structural formula I

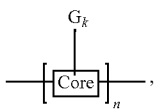

(I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and wherein the organic compound of the second type has a general structural formula II

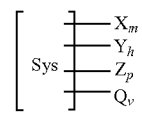

(II)

where Sys is an at least partially conjugated substantially planar polycyclic molecular system; X, Y, Z and Q are substituents; substituent X is a carboxylic group —COOH, substituent Y is a sulfonic group —$SO_3H$, substituent Z is a carboxamide —$CONH_2$, substituent Q is a sulfonamide —$SO_2NH_2$, and m, h, p, v are 0, 1, 2, 3, or 4; wherein the organic compound of the second type is capable of forming board-like supramolecules via π-π-interaction; wherein the composition of the organic compounds of the first and the second type or their salts is capable of forming a lyotropic liquid crystal solution; and wherein the solution is capable of forming a solid retardation layer of biaxial type substantially transparent to electromagnetic radiation in the visible spectral range.

DETAILED DESCRIPTION OF THE INVENTION

Figure 1:
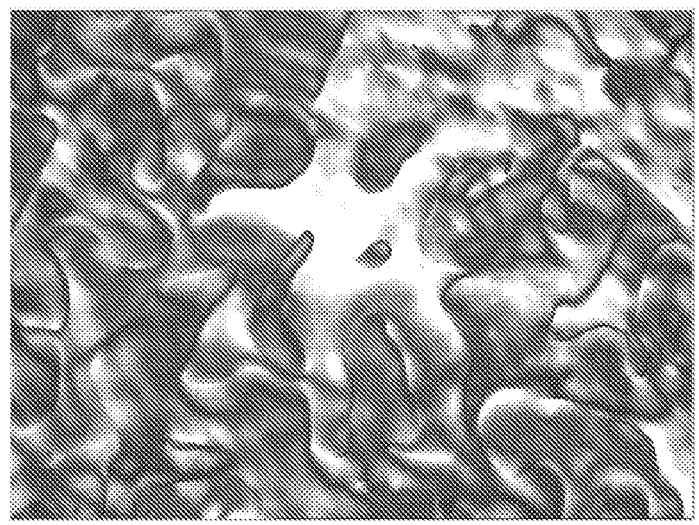
FIG. 1 shows a polarizing microscopy image of the lyotropic liquid crystal solution texture of poly(2,2'-disulfonyl-4,4'-benzidine terephthalamide) cesium salt (concentration is approximately 5.6 wt. %)

The general description of the present invention having been made, a further understanding can be obtained by reference to the specific preferred embodiments, which are given herein only for the purpose of illustration and are not intended to limit the scope of the appended claims.

Definitions of various terms used in the description and claims of the present invention are listed below.

The term "visible spectral range" refers to a spectral range having the lower boundary approximately equal to 400 nm, and upper boundary approximately equal to 700 nm.

The term "retardation layer" refers to an optically anisotropic layer which is characterized by three principal refractive indices ($n_x$, $n_y$, and $n_z$), wherein two principal directions for refractive indices $n_x$ and $n_y$ belong to xy-plane coinciding with a plane of the retardation layer and one principal direction for refractive index ($n_z$) coincides with a normal line to the retardation layer.

The term "optically anisotropic biaxial retardation layer" refers to an optical layer which refractive indices $n_x$, $n_y$, and $n_z$ obey the following condition in the visible spectral range: $n_x \neq n_z \neq n_y$.

The term "optically anisotropic retardation layer of $A_C$-type" refers to an optical layer which refractive indices $n_x$, $n_y$, and $n_z$ obey the following condition in the visible spectral range: $n_z < n_y < n_x$.

The term "optically anisotropic retardation layer of $B_A$-type" refers to an optical layer which refractive indices $n_x$, $n_y$, and $n_z$ obey the following condition in the visible spectral range: $n_x < n_z < n_y$.

The term "NZ-factor" refers to the quantitative measure of degree of biaxiality which is calculated as follows:

$$NZ = \frac{\text{Max}(n_x, n_y) - n_z}{\text{Max}(n_x, n_y) - \text{Min}(n_x, n_y)}$$

The above mentioned definitions are invariant to rotation of system of coordinates (of the laboratory frame) around of the vertical z-axis for all types of anisotropic layers.

As used herein, a "front substrate surface" refers to a surface facing a viewer. A "rear substrate surface" refers to the surface opposite to the front surface.

The term "board-like supramolecule" refers to a supramolecule, the longitudinal (L) and cross-section sizes (width S and height H) of which satisfy to the following ratio: $L \gg S \geq H$.

In one preferable embodiment of the present invention, a composition is provided comprising at least one organic compound of a first type, and at least one organic compound of a second type, wherein the organic compound of the first type has a general structural formula I

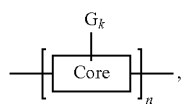   (I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and wherein the organic compound of the second type has a general structural formula II

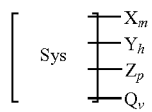   (II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide —CONH$_2$, substituent Q is a sulfonamide —SO$_2$NH$_2$ and m, h, p, v are 0, 1, 2, 3, or 4; the organic compound of the second type is capable of forming board-like supramolecules via π-π-interaction; the composition of the above described compounds or their salts is capable of forming a lyotropic liquid crystal solution; and the solution is capable of forming a solid retardation layer of biaxial type substantially transparent to electromagnetic radiation in the visible spectral range.

In one embodiment of the disclosed composition, the type and degree of biaxiality of the solid retardation layer is controlled by a molar ratio of the organic compounds of the first and the second type in the composition. In another embodiment of the disclosed composition, the number k is equal to 0, 1, 2, 3, 4, 5, 6, 7, or 8, and the number n is an integer in the range from 10 to 10000. In yet another embodiment of the disclosed composition, the organic compound of the first type has a polymeric main rigid-chain, wherein the conjugated organic units are the same. In still another embodiment of the disclosed composition, the organic compound of the first type has a copolymeric main rigid-chain, wherein at least one conjugated organic unit is different from others. In one embodiment of the disclosed composition, the number k is more than 1, and the ionogenic side-groups are the same. In another embodiment of the disclosed composition, the number k is more than 1, and at least one said ionogenic side-group is different from others. In still another embodiment of the disclosed composition, at least one conjugated organic unit (Core) of the organic compound of the first type has a general structural formula III -(Core1)-S1-(Core2)-S2-   (III)

wherein Core1 and Core2 are conjugated organic components, and spacers S1 and S2 are selected independently from the list comprising —C(O)—NH—, —NH—C(O)—, —O—NH—, linear and branched (C$_1$-C$_4$)alkylenes, linear and branched (C$_1$-C$_4$)alkenylenes, —O—CH$_2$—, —CH$_2$—O—, —CH=CH—, —CH=CH—C(O)O—, —O(O)C—CH=CH—, —C(O)—CH$_2$—, —OC(O)—O—, —IC(O)—, —C≡C—, —C(O)—S—, —S—, —S—C(O)—, —O—, —NH—, —N(CH$_3$)—. In yet another embodiment of the disclosed composition, at least one rigid-core polymer is copolymer having the general structural formula IV

   (IV)

wherein Core1, Core2, Core3 and Core4 are conjugated organic components, spacers S1, S2, S3 and S4 are selected independently from the list comprising —C(O)—NH—, —NH—C(O)—, —O—NH—, linear and branched (C$_1$-C$_4$) alkylenes, linear and branched (C$_1$-C$_4$)alkenylenes, (C$_2$-C$_{20}$) polyethylene glycols, —O—CH$_2$—, —CH$_2$—O—, —CH=CH—, —CH=CH—C(O)O—, —O(O)C—CH=CH—, —C(O)—CH$_2$—, —OC(O)—O—, —OC(O)—, —C≡C—, —C(O)—S—, —S—, —S—C(O)—, —O—, —NH—, —N(CH$_3$)—, n is an integer in the range from 10 to 10000, t is an integer in the range from 1 to n−1 and j is 0 or 1, and wherein at list one conjugated organic component out of Core3 and Core4 differs from Core1 and Core2.

Examples of the conjugated organic components Core1, Core2, Core3 and Core4 of the organic compound of the first type represented by the general structural formulas (III) and (IV) are given in Table 1.

TABLE 1

Examples of the structural formulas of Core1, Core2, Core3 and Core4 according to the present invention.

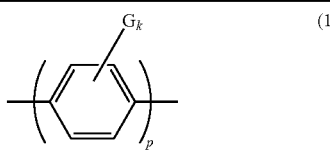   (1)

TABLE 1-continued

Examples of the structural formulas of Core1, Core2, Core3 and Core4 according to the present invention.

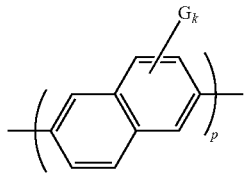
(2)

The ionogenic side-groups G are the same or different and independently selected from the list comprising —COOH, —SO$_3$H, and —H$_2$PO$_3$, k is equal to 0, 1 or 2, and p is equal to 1, 2 or 3.

In still another embodiment the organic compound of the first type of the general structural formula (I) is selected from structures 3 to 13 given in Table 2, wherein the ionogenic side-group G is sulfonic group —SO$_3$H, and k is equal to 1 or 2.

TABLE 2

Examples of the structural formulas of the organic compounds of the first type according to the present invention.

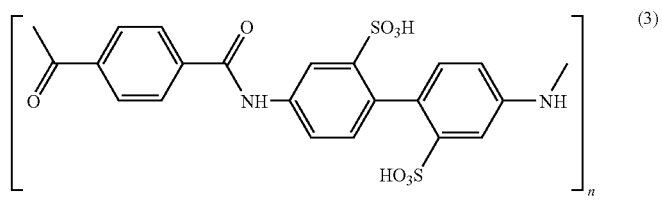
(3)

Poly(2,2'-disulfo-4,4'-benzidine terephthalamide)

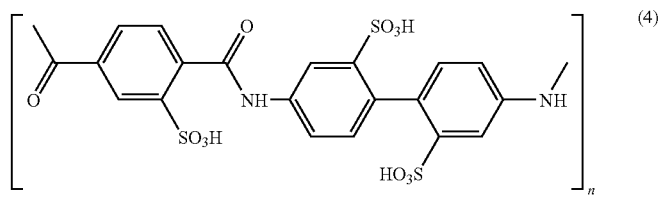
(4)

Poly(2,2'-disulfo-4,4'-benzidine sulfoterephthalamide)

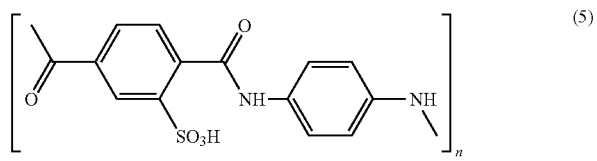
(5)

Poly(para-phenylene sulfoterephthalamide)

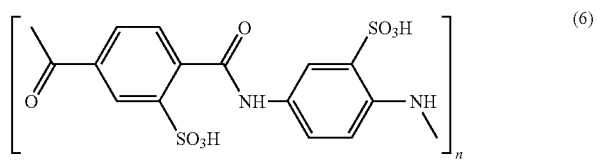
(6)

Poly(2-sulfo-1,4-phenylene sulfoterephthalamide)

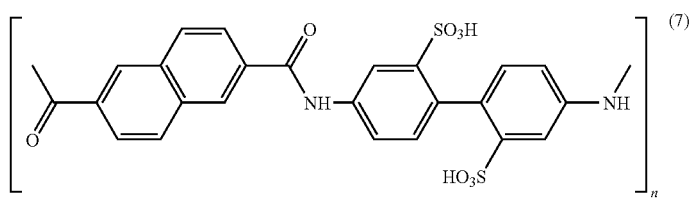
(7)

Poly(2,2'-disulfo-4,4'-benzidine naphthalene-2,6-dicarboxamide)

TABLE 2-continued

Examples of the structural formulas of the organic compounds of the first type according to the present invention.

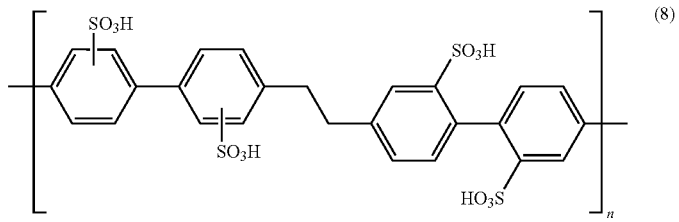

(8)

Poly(disulfobiphenylene-1,2-ethylene-2,2'-disulfobiphenylene

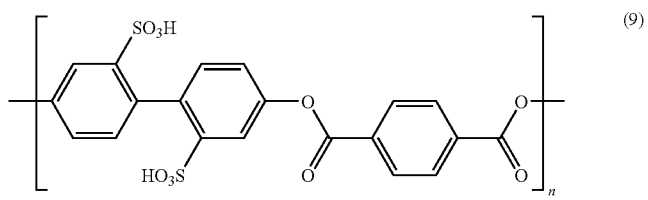

(9)

Poly(2,2'-disulfobiphenyl-dioxyterephthaloyl)

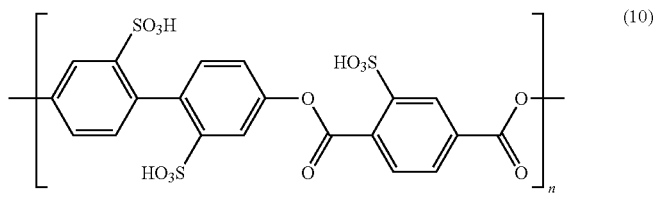

(10)

Poly(2,2'-disulfobiphenyl-2-sulfodioxyterephthaloyl)

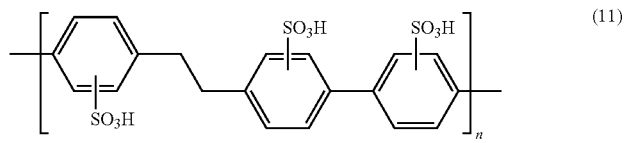

(11)

Poly(sulfophenylene-1,2-ethylene-2,2'-disulfophenylene)

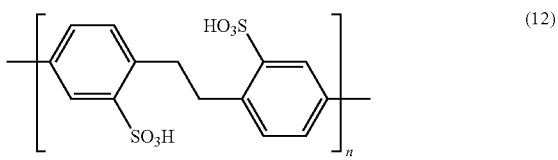

(12)

Poly(2-sulfophenylene-1,2-ethylene-2'-sulfophenylene)

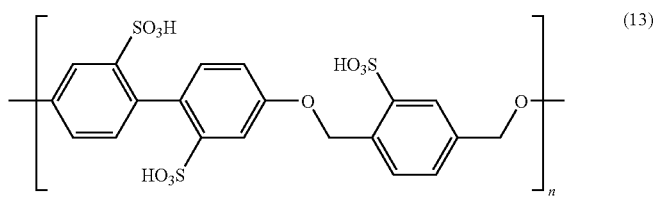

(13)

Poly(2,2'-disulfobiphenyl-2-sulfo-1,4-dioxymethylphenylene)

In still another embodiment of the disclosed composition, the organic compound of the first type further comprises additional side-groups independently selected from the list comprising linear and branched ($C_1$-$C_{20}$)alkyl, ($C_2$-$C_{20}$)alkenyl, and ($C_2$-$C_{20}$)alkinyl In yet another embodiment of the disclosed composition, at least one of the additional side-groups of the organic compound of the first type is connected with the Core via a bridging group A selected from the list comprising —C(O)—, —C(O)O—, —C(O)—NH—, —($SO_2$)NH—, —O—, —$CH_2$O—, —NH—, >N—, and any combination thereof.

In one embodiment of the disclosed composition, the salt of the organic compound of the first type is selected from the list comprising ammonium and alkali-metal salts.

At least partially conjugated substantially planar polycyclic molecular systems Sys of the organic compound of the second type is selected from structures 14 to 27 given in Table 3.

TABLE 3

Examples of at least partially conjugated substantially planar polycyclic molecular systems Sys

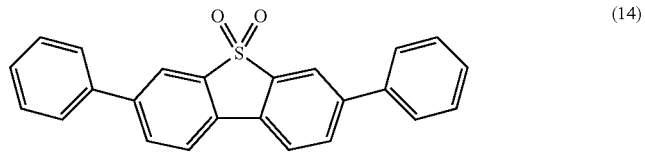
(14)

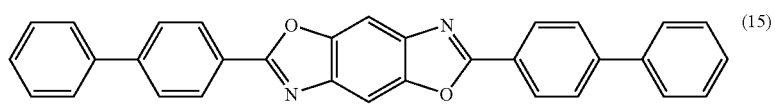
(15)

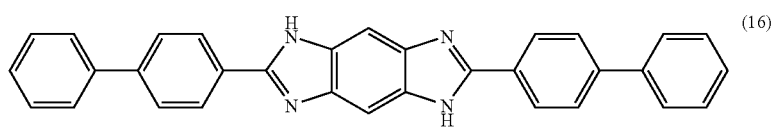
(16)

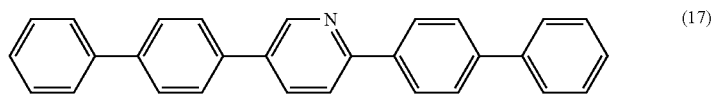
(17)

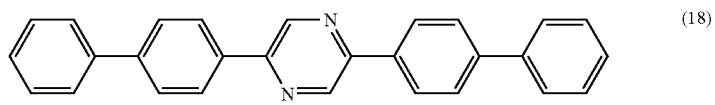
(18)

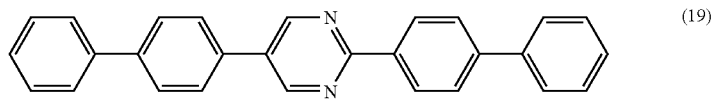
(19)

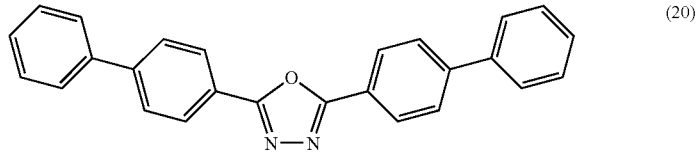
(20)

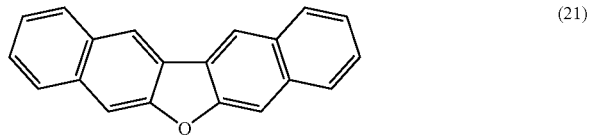
(21)

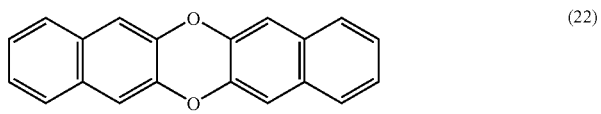
(22)

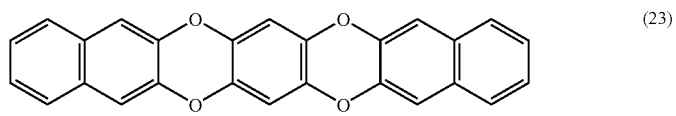
(23)

TABLE 3-continued

Examples of at least partially conjugated substantially planar polycyclic molecular systems Sys

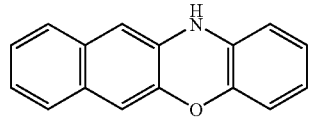 [SMILES: c1ccc2c(c1)Nc1cc3ccccc3cc1O2]
(24)

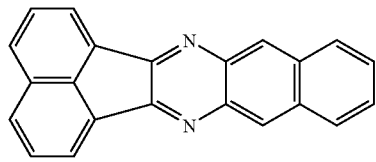 [SMILES: c1ccc2cc3nc4c(nc3cc2c1)-c1cccc2cccc-4c12]
(25)

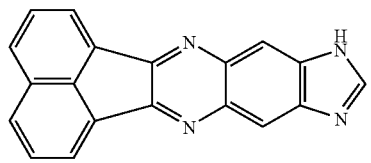 [SMILES: c1cc2c3c(cccc3c1)-c1nc3cc4[nH]cnc4cc3nc1-2]
(26)

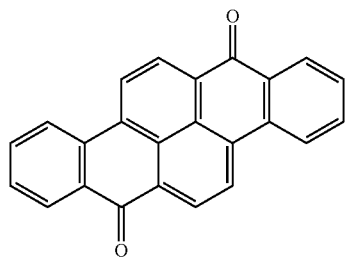 [SMILES: O=C1c2ccccc2-c2ccc3c4c(ccc1c24)-c1ccccc1C3=O]
(27)

In other embodiment the organic compounds of the second type of the general structural formula (II) is selected from structures 28 to 35 given in Table 4, where the molecular system Sys is selected from structures 14 and 21 to 27 of Table 3 and the substituent is a sulfonic group —$SO_3H$, and m, p, v, and w are equal to 0.

TABLE 4

Examples of the structural formulas of the organic compounds of the second type according to the present invention.

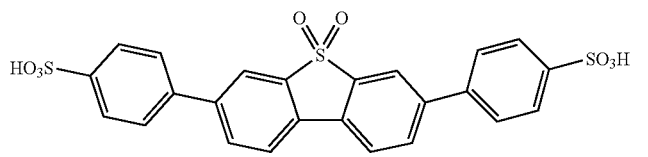
(28)

4,4'-(5,5-dioxidodibenzo[b,d]thiene-3,7-diyl)dibenzenesulfonic acid, where Sys has the general structural formula (14)

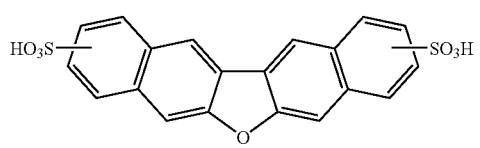
(29)

dinaphto[2,3-b:2',3'-d]furan disulfonic acid, where Sys has the general structural formula (21)

TABLE 4-continued

Examples of the structural formulas of the organic compounds of the second type according to the present invention.

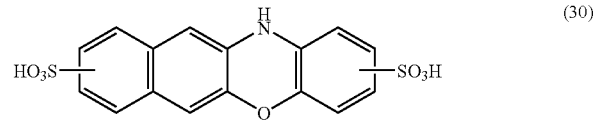

(30)

12H-benzo[b]phenoxazine disulfonic acid, where Sys has the general structural formula (24)

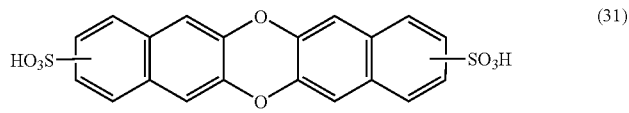

(31)

dibenzo[b,i]oxanthrene disulfonic acid, where Sys has the general structural formula (22)

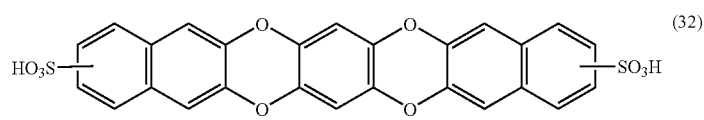

(32)

benzo[b]naphto[2',3':5,6]dioxino[2,3-i]oxanthrene disulfonic acid, where Sys has the general structural formula (23)

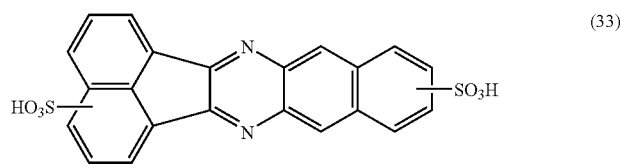

(33)

acenaphtho[1,2-b]benzo[g]quinoxaline disulfonic acid, where Sys has the general structural formula (25)

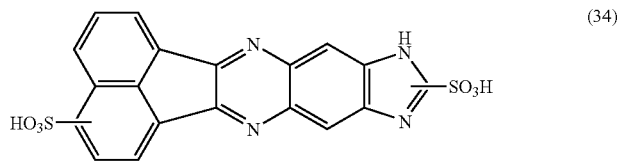

(34)

9H-acenaphtho[1,2-b]imidazo[4,5-g]quinoxaline disulfonic acid, where Sys has the general structural formula (26)

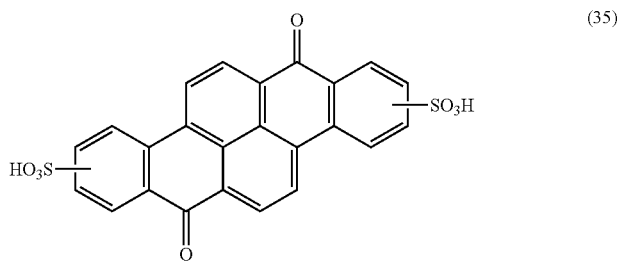

(35)

dibenzo[b,def]chrysene-7,14-dion disulfonic acid, where Sys has the general structural formula (27)

In another embodiment the disclosed composition further comprises inorganic compounds which are selected from the list comprising hydroxides and salts of alkali metals.

In a further aspect, the present invention provides an optical film comprising a substrate having front and rear surfaces, and at least one solid retardation layer on the front surface of the substrate, wherein the solid retardation layer comprises at least one organic compound of the first type and at least one organic compound of the second type, wherein the organic compound of the first type has a general structural formula I

(I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and
wherein the organic compound of the second type has a general structural formula II

(II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide —CONH$_2$, substituent Q is a sulfonamide —SO$_2$NH$_2$, and m, h, p, v are 0, 1, 2, 3, or 4; wherein the organic compound of the second type is capable of forming board-like supramolecules via π-π-interaction; wherein the composition of the organic compounds of the first and the second type or their salts is capable of forming a lyotropic liquid crystal solution; and wherein the solution is capable of forming a solid retardation layer of biaxial type substantially transparent to electromagnetic radiation in the visible spectral range.

In one embodiment of the disclosed optical film, the type and degree of biaxiality of the said optical retardation layer is controlled by a molar ratio of the organic compounds of the first and the second type in the composition. In another embodiment of the disclosed optical film, the number k is equal to 0, 1, 2, 3, 4, 5, 6, 7, or 8, and the number n is an integer in the range from 10 to 10000. In yet another embodiment of the disclosed optical film, the organic compound of the first type has a polymeric main rigid-chain, wherein the conjugated organic units are the same. In still another embodiment of the disclosed optical film, the organic compound of the first type has a copolymeric main rigid-chain, wherein at least one conjugated organic unit is different from others. In one embodiment of the disclosed optical film, the number k is more than 1, and the ionogenic side-groups are the same. In another embodiment of the disclosed optical film, the number k is more than 1, and at least one said ionogenic side-group is different from others.

In still another embodiment of the disclosed optical film, at least one conjugated organic unit (Core) of the organic compound of the first type has a general structural formula III

-(Core1)-S1-(Core2)-S2-  (III)

wherein Core1 and Core2 are conjugated organic components, and spacers S1 and S2 are selected independently from the list comprising —C(O)—NH—, —NH—C(O)—, —O—NH—, linear and branched (C$_1$-C$_4$)alkylenes, linear and branched (C$_1$-C$_4$)alkenylenes, —O—CH$_2$—, —CH$_2$—O—, —CH═CH—, —CH═CH—C(O)O—, —O(O)C—CH═CH—, —C(O)—CH$_2$—, —OC(O)—O—, —OC(O)—, —C≡C—, —C(O)—S—, —S—, —S—C(O)—, —O—, —NH—, —N(CH$_3$)—. In yet another embodiment of the disclosed optical film, at least one rigid-core polymer is copolymer having the general structural formula IV

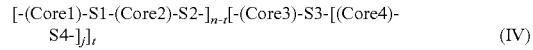

[-(Core1)-S1-(Core2)-S2-]$_{n-t}$[-(Core3)-S3-[(Core4)-S4-]$_j$]$_t$  (IV)

wherein Core1, Core2, Core3 and Core4 are conjugated organic components, spacers S1, S2, S3 and S4 are selected independently from the list comprising —C(O)—NH—, —NH—C(O)—, —O—NH—, linear and branched (C$_1$-C$_4$) alkylenes, linear and branched (C$_1$-C$_4$)alkenylenes, (C$_2$-C$_{20}$) polyethylene glycols, —O—CH$_2$—, —CH$_2$—O—, —CH═CH—, —CH═CH—C(O)O—, —O(O)C—CH═CH—, —C(O)—CH$_2$—, —OC(O)—O—, —OC(O)—, —C≡C—, —C(O)—S—, —S—, —S—C(O)—, —O—, —NH—, —N(CH$_3$)—, n is an integer in the range from 10 to 10000, t is an integer in the range from 1 to n−1 and j is 0 or 1, and wherein at list one conjugated organic component out of Core3 and Core4 differs from Core1 and Core2. Examples of the conjugated organic components Core1, Core2, Core3 and Core4 are given in Table 1, wherein the ionogenic side-groups G are selected from the list comprising —COOH, —SO$_3$H, and —H$_2$PO$_3$, k is equal 0, 1 or 2, p is equal to 1, 2 or 3.

In one embodiment of the disclosed optical film, the ionogenic side-groups provide a solubility of the organic compound of the first type or its salts in water and are the same or different and independently selected from the list comprising —COOH, —SO$_3$H, and —H$_2$PO$_3$.

In one embodiment the organic compounds of the first type of the general structural formula [I] is selected from structures 3 to 13 given in Table 2, wherein the ionogenic side-group G is sulfonic group —SO$_3$H, and k is equal to 0, 1 or 2.

In still another embodiment of the disclosed optical film, the organic compound of the first type further comprises additional side-groups independently selected from the list comprising linear and branched (C$_1$ C$_{20}$)alkyl, (C$_2$-C$_{20}$)alkenyl, and (C$_2$-C$_{20}$)alkinyl In yet another embodiment of the disclosed optical film, at least one of the additional side-groups of the organic compound of the first type is connected with the Core via a bridging group A selected from the list comprising —C(O)—, —C(O)O—, —C(O)—NH—, —(SO$_2$)NH—, —O—, —CH$_2$O—, —NH—, >N—, and any combination thereof. In one embodiment of the disclosed optical film, the salt of the organic compound of the first type is selected from the list comprising ammonium and alkali-metal salts.

In still another embodiment of the disclosed optical film, at least partially conjugated substantially planar polycyclic molecular systems Sys of the organic compound of the second type represented by the general structural formula (II) is selected from structures 14 to 27 given in Table 3.

In another embodiment the organic compounds of the second type of the general structural formula (II) is selected from structures 28 to 35 given in Table 4, where the molecular systems Sys are represented by the structures 14 and 21 to 27, the substituent is sulfonic group —SO$_3$H; and m, p, v, and w are equal to 0.

In one embodiment of the present invention, the optical film further comprises inorganic compounds which are selected from the list comprising hydroxides and salts of alkali metals.

In another embodiment of the disclosed optical film, the solid retardation layer is generally a biaxial retardation layer possessing two refractive indices (n$_x$ and n$_y$) corresponding to two mutually perpendicular directions in the plane of the substrate front surface and one refractive index (n$_z$) in the normal direction to the substrate front surface, and wherein the refractive indices obey the following condition: n$_x \neq$n$_z \neq$n$_y$.

In still another embodiment of the disclosed optical film, the solid retardation layer is retardation layer which type and degree of biaxiality is predetermined via controlling molar ratio of composition of the organic compounds of the first and the second type. In one embodiment of the disclosed optical film, the refractive indices of said retardation layer obey the following condition: n$_x$<n$_y$<n$_x$. In another embodiment of the disclosed optical film, the refractive indices of said retardation layer obey the following condition: n$_x$<n$_z$<n$_y$.

In another preferred embodiment the substrate is transparent to electromagnetic radiation in the visible spectral range. The substrate may comprise a polymer, for example PET (polyethylene terephthalate) or TAC (triacetyl cellulose). In alternative embodiment of the disclosed optical film, the substrate comprises a glass. In one embodiment of the disclosed optical film, the transmission coefficient of the substrate does not exceed 2% at any wavelength in the UV spectral range. In another embodiment of the optical film, the transmission coefficient of the substrate in the visible spectral range is not less than 90%.

In one embodiment of the disclosed invention, the optical film further comprises a protective coating formed on the adhesive transparent layer.

In one embodiment of the optical film, the substrate is a specular or diffusive reflector.

In another embodiment of the optical film, the substrate is a reflective polarizer. In still another embodiment, the optical film further comprises a planarization layer deposited onto the front surface of the substrate. In yet another embodiment of the invention, the optical film further comprises an additional transparent adhesive layer placed on top of the organic layer. In another possible embodiment of the invention, the optical film further comprises an additional transparent adhesive layer placed on top of the optical film. In one embodiment of the disclosed invention, the optical film further comprises a protective coating formed on the adhesive transparent layer. In one embodiment of the disclosed optical film comprising an adhesive layer, the transmission coefficient of the adhesive layer does not exceed 2% at any wavelength in the UV spectral range. In another embodiment of the disclosed optical film, the transmission coefficient of the adhesive layer in the visible spectral range is not less than 90%.

In yet further aspect, the present invention provides a method of producing an optical film, comprising the steps of
a) preparation of a lyotropic liquid crystal solution of a composition comprising at least one organic compound of a first type, and at least one organic compound of a second type, wherein the organic compound of the first type has a general structural formula I

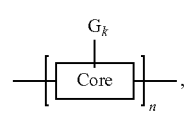

(I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; and the number n provides molecule anisotropy that promotes self-assembling of the macromolecules in a solution of the organic compound or its salt, and
wherein the organic compound of the second type has a general structural formula II

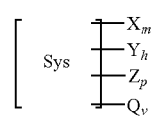

(II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide, substituent Q is a sulfonamide, and m, h, p, v are 0, 1, 2, 3, or 4, wherein the organic compound of the second type is capable of forming board-like supramolecules via π-π-interaction; and wherein the composition of the organic compounds of the first and the second type or their salts is capable of forming a lyotropic liquid crystal solution;
b) application of a liquid layer of the solution onto a substrate, wherein the liquid layer is substantially transparent to electromagnetic radiation in the visible spectral range;
c) application of an external alignment action onto said liquid layer; and
d) drying to form a solid optical retardation layer.

In one embodiment of the disclosed method, the external alignment is applied with a shear force, and with the increasing shear rate the viscosity of the solution decreases below approximately 200 mPa·s. In another embodiment of the disclosed method, the external alignment step is performed simultaneously with the step of application of the liquid layer to the substrate.

In one embodiment of the disclosed method, the number k is equal to 0, 1, 2, 3, 4, 5, 6, 7, or 8, and the number n is an integer in the range from 10 to 10000. In another embodiment of the disclosed method, the organic compound of the first type has a polymeric main rigid-chain, wherein the conjugated organic units are the same. In still another embodiment of the disclosed method, the organic compound of the first type has a copolymeric main rigid-chain, wherein at least one conjugated organic unit is different from others. In one embodiment of the disclosed method, the number k is more than 1, and the ionogenic side-groups are the same. In another embodiment of the disclosed method, the number k is more than 1, and at least one said ionogenic side-group is different from others. In still another embodiment of the disclosed method, at least one conjugated organic unit (Core) of the organic compound of the first type has a general structural formula III $$-(Core1)-S1-(Core2)-S2- \qquad (III)$$

wherein Core1 and Core2 are conjugated organic components, and spacers S1 and S2 are selected independently from the list comprising —C(O)—NH—, —NH—C(O)—, —O—NH—, linear and branched ($C_1$-$C_4$)alkylenes, linear and branched ($C_1$-$C_4$)alkenylenes, —O—$CH_2$—, —$CH_2$—O—, —CH=CH—, —CH=CH—C(O)O—, —O(O)C—CH=CH—, —C(O)—$CH_2$—, —OC(O)—O—, —OC(O)—, —C≡C—, —C(O)—S—, —S—, —S—C(O)—, —O—, —NH—, —N($CH_3$)—. In yet another embodiment of the disclosed method, at least one rigid-core polymer is copolymer having the general structural formula IV $$[-(Core1)-S1-(Core2)-S2]_{n-t}-[-(Core3)-S3-[(Core4)-S4-]_j]_t \qquad (IV)$$

wherein Core1, Core2, Core3 and Core4 are conjugated organic components, spacers S1, S2, S3 and S4 are selected independently from the list —C(O)—NH—, —NH—C(O)—, —O—NH—, linear and branched ($C_1$-$C_4$)alkylenes, linear and branched ($C_1$-$C_4$)alkenylenes, ($C_2$-$C_{20}$)polyethylene glycols, —O—$CH_2$—, —$CH_2$—O—, —CH=CH—, —CH=CH—C(O)O—, —O(O)C—CH=CH—, —C(O)—$CH_2$—, —OC(O)—O—, —OC(O)—, —C≡C—, —C(O)—S—, —S—, —S—C(O)—, —O—, —NH—, —N($CH_3$)—, n is an integer in the range from 10 to 10000, t is an integer in the range from 1 to n–1 and j is 0 or 1, and wherein at list one conjugated organic component out of Core3 and Core4 differs from Core1 and Core2. Examples of the conjugated organic components Core1, Core2, Core3 and Core4 are given in Table 1, wherein the ionogenic side-groups G are selected from the list comprising —COOH, —$SO_3H$, and —$H_2PO_3$, k is equal 0, 1 or 2, p is equal to 1, 2 or 3.

In one embodiment of the disclosed method, the ionogenic side-groups provide a solubility of the organic compound of the first type or its salts in water and are the same or different and independently selected from the list comprising —COOH, —$SO_3H$, and —$H_2PO_3$.

In one embodiment the organic compounds of the first type of the general structural formula (I) is selected from structures 3 to 13 given in Table 2, wherein the ionogenic side-group G is sulfonic group —$SO_3H$, and k is equal to 0, 1 or 2.

In still another embodiment of the disclosed method, the organic compound of the first type further comprises additional side-groups independently selected from the list comprising linear and branched ($C_1$-$C_{20}$)alkyl, ($C_2$-$C_{20}$)alkenyl, and ($C_2$-$C_{20}$)alkinyl In yet another embodiment of the disclosed method, at least one of the additional side-groups of the organic compound of the first type is connected with the Core via a bridging group A selected from the list comprising —C(O)—, —C(O)O—, —C(O)—NH—, —($SO_2$)NH—, —O—, —$CH_2$O—, —NH—, >N—, and any combination thereof. In one embodiment of the disclosed method, the salt of the organic compound of the first type is selected from the list comprising ammonium and alkali-metal salts.

In another embodiment at least partially conjugated substantially planar polycyclic molecular systems Sys of the organic compound of the second type is selected from structures 14 to 27 given in Table 3.

In still further embodiment of the disclosed method, the organic compounds of the second type of the general structural formula (II) is selected from structures 28 to 35 given in Table 4, where the molecular systems Sys are represented by the structures 14 and 21 to 27, the substituent is sulfonic group —$SO_3H$; and m, p, v, and w are equal to 0.

In one embodiment of the disclosed method, the solvent is selected from the list comprising water, alkalis and acids or any combination thereof. In another embodiment of the disclosed method, the organic solvent is selected from the list comprising ketones, carboxylic acids, hydrocarbons, cyclohydrocarbons, chlorohydrocarbons, alcohols, ethers, esters, and any combination thereof. In a preferred embodiment of the disclosed method, the organic solvent is selected from the list comprising acetone, xylene, toluene, ethanol, methylcyclohexane, ethyl acetate, diethyl ether, octane, chloroform, methylenechloride, dichloroethane, trichloroethene, tetrachloroethene, carbon tetrachloride, 1,4-dioxane, tetrahydrofuran, pyridine, triethylamine, nitromethane, acetonitrile, dimethylformamide, dimethulsulfoxide, and any combination thereof.

In one embodiment of the disclosed method, the salt is selected from the list comprising alkali-metal salts and ammonium salt. In the disclosed method the lyotropic liquid crystal may further comprise inorganic compounds which are selected from the list comprising hydroxides and salts of alkali metals.

In another embodiment of the disclosed method, the substrate is made of a material selected from the list comprising a polymer and a glass. In the present invention, the disclosed method may further comprise a post-treatment step comprising a post-treatment with a solution of an water-soluble inorganic salt comprising a cation selected from the list comprising $H^+$, $Ba^{2+}$, $Pb^{2+}$, $ca^{2+}$, $Mg^{2+}$, $Sr^{2+}$, $La^{3+}$, $Zn^{2+}$, $Zr^{4+}$, $Ce^{3+}$, $Y^{3+}$, $Yb^{3+}$, $Gd^{3+}$ and any combination thereof.

In one embodiment of the disclosed method, the application of the liquid layer to the substrate step and post-treatment step are carried out simultaneously. In another embodiment of the disclosed method, the drying and post-treatment steps are carried out simultaneously. In still another embodiment of the disclosed method, the post-treatment step is carried out after drying.

In still another embodiment of the disclosed method, the alignment action on the deposited liquid layer is performed with use of equipment selected from the list comprising Mayer rod, slot die, extrusion, roll coating, curtain coating, knife coating and molding. In one embodiment of the disclosed method, the external alignment action on the deposited layer is performed with the use of mechanical translation over the layer of at least one aligning tool and the distance from the substrate surface to the edge or the plane of the aligning tool is set so as to obtain desired film thickness. In this method, the aligning tool may be heated.

In another embodiment of the disclosed method, the drying step is executed in airflow and/or at elevated temperature.

In still another embodiment of the present invention, the disclosed method further comprises a pretreatment step which takes place before the application onto the substrate. The pretreatment step may comprise the step of making the surface of the substrate hydrophilic. In another embodiment of this method, the pretreatment further comprises application of a planarization layer. In yet another embodiment of the disclosed method, the sequence of the technological steps is repeated two or more times and the solution used in the fabrication of each subsequent solid retardation layer is either the same or different from that used in the previous cycle.

In still further aspect, the present invention provides a liquid crystal display comprising a vertical alignment mode liquid crystal cell, two polarizers arranged on each side of the liquid crystal cell, and at least one compensating structure located between said polarizers, wherein the polarizers have transmission axes which are perpendicular to each other, and the compensating structure comprises at least one retardation layer, wherein the retardation layer comprises at least one organic compound of the first type and at least one organic compound of the second type, wherein the organic compound of the first type has a general structural formula I

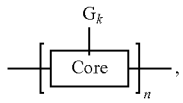  (I)

where Core is a conjugated organic unit capable of forming a rigid rod-like macromolecule, n is a number of the conjugated organic units in the rigid rod-like macromolecule, Gk is a set of ionogenic side-groups, and k is a number of the side-groups in the set Gk; the ionogenic side-groups and the number k provide solubility of the organic compound of the first type in the solvent and give rigidity to the rod-like macromolecule; the number n provides molecule anisotropy that promotes self-assembling of the macromolecules in a solution of the organic compound or its salt, and wherein the organic compound of the second type has a general structural formula II

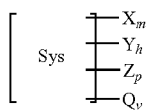  (II)

where Sys is an at least partially conjugated substantially planar polycyclic molecular system; X, Y, Z and Q are substituents; substituent X is a carboxylic group —COOH, substituent Y is a sulfonic group —SO$_3$H, substituent Z is a carboxamide —CONH$_2$, substituent Q is a sulfonamide —SO$_2$NH$_2$, and m, h, p, v are 0, 1, 2, 3, or 4; wherein the organic compound of the second type is capable of forming board-like supramolecules via π-π-interaction; wherein the composition of the organic compounds of the first and the second type or their salts is capable of forming a lyotropic liquid crystal solution; and wherein the solution is capable of forming a solid retardation layer of biaxial type substantially transparent to electromagnetic radiation in the visible spectral range.

In one embodiment of the disclosed liquid crystal display, the number k is equal to 0, 1, 2, 3, 4, 5, 6, 7, or 8, and the number n is an integer in the range from 10 to 10000. In another embodiment of the disclosed liquid crystal display, the organic compound of the first type has a polymeric main rigid-chain, wherein the conjugated organic units are the same. In still another embodiment of the disclosed liquid crystal display, the organic compound of the first type has a copolymeric main rigid-chain, wherein at least one conjugated organic unit is different from others. In one embodiment of the disclosed liquid crystal display, the number k is more than 1, and the ionogenic side-groups are the same. In another embodiment of the disclosed liquid crystal display, the number k is more than 1, and at least one said ionogenic side-group is different from others.

In still another embodiment of the disclosed liquid crystal display, at least one conjugated organic unit (Core) of the organic compound of the first type has a general structural formula III -(Core1)-S1-(Core2)-S2-  (III)

wherein Core1 and Core2 are conjugated organic components, and spacers S1 and S2 are selected independently from the list —C(O)—NH—, —NH—C(O)—, —O—NH—, linear and branched (C$_1$-C$_4$)alkylenes, linear and branched (C$_1$-C$_4$)alkenylenes, —O—CH$_2$—, —CH$_2$—O—, —CH=CH—, —CH=CH—C(O)O—, —O(O)C—CH=CH—, —C(O)—CH$_2$—, —OC(O)—O—, —OC(O)—, —C≡C—, —C(O)—S—, —S—, —S—C(O)—, —O—, —NH—, —N(CH$_3$)—. In yet another embodiment of the disclosed liquid crystal display, at least one rigid-core polymer is copolymer having the general structural formula IV

[-(Core1)-S1-(Core2)-S2]$_{n-t}$[-(Core3)-S3-[(Core4)-S4-]$_j$]$_t$  (IV)

wherein Core1, Core2, Core3 and Core4 are conjugated organic components, spacers S1, S2, S3 and S4 are selected independently from the list comprising —C(O)—NH—, —NH—C(O)—, —O—NH—, linear and branched (C$_1$-C$_4$) alkylenes, linear and branched (C$_1$-C$_4$)alkenylenes, (C$_2$-C$_{20}$) polyethylene glycols, —O—CH$_2$—, —CH$_2$—O—, —CH=CH—, —CH=CH—C(O)O—, —O(O)C—CH=CH—, —C(O)—CH$_2$—, —OC(O)—O—, —OC(O)—, —C≡C—, —C(O)—S—, —S—, —S—C(O)—, —O—, —NH—, —N(CH$_3$)—, n is an integer in the range from 10 to 10000, t is an integer in the range from 1 to n−1 and j is 0 or 1, and wherein at list one conjugated organic component out of Core3 and Core4 differs from Core1 and Core2. Examples of the conjugated organic components Core1, Core2, Core3 and Core4 are given in Table 1, wherein the ionogenic side-groups G are selected from the list comprising —COOH, —SO$_3$H, and —H$_2$PO$_3$, k is equal 0, 1 or 2, p is equal to 1, 2 or 3.

In one embodiment of the disclosed liquid crystal display, the ionogenic side-groups provide a solubility of the organic compound of the first type or its salts in water and are the same or different and independently selected from the list comprising —COOH, —SO$_3$H, and —H$_2$PO$_3$.

In one embodiment the organic compounds of the first type of the general structural formula [I] is selected from structures 3 to 13 given in Table 2, wherein the ionogenic side-group G is sulfonic group —SO$_3$H, and k is equal to 0, 1 or 2.

In still another embodiment of the disclosed liquid crystal display, the organic compound of the first type further comprises additional side-groups independently selected from the list comprising linear and branched (C$_1$-C$_{20}$)alkyl, (C$_2$-C$_{20}$) alkenyl, and (C$_2$-C$_{20}$)alkinyl In yet another embodiment of the disclosed liquid crystal display, at least one of the additional side-groups of the organic compound of the first type is connected with the Core via a bridging group A selected from the list comprising —C(O)—, —C(O)O—, —C(O)—NH—, —(SO$_2$)NH—, —O—, —CH$_2$O—, —NH—, >N—, and any combination thereof. In one embodiment of the disclosed liquid crystal display, the salt of the organic compound of the first type is selected from the list comprising ammonium and alkali-metal salts.

In still another embodiment of the disclosed liquid crystal display, at least partially conjugated substantially planar polycyclic molecular systems Sys of the organic compound of the second type represented by the general structural formula (II) is selected from structures 14 to 27 given in Table 3.

In another possible embodiment the organic compounds of the second type of the general structural formula (II) is selected from structures 28 to 35 given in Table 4, where the molecular systems Sys are represented by the structures 14 and 21 to 27, the substituent is sulfonic group —SO$_3$H; and m, p, v, and w are equal to 0.

In one embodiment of the present invention, the liquid crystal display further comprises inorganic compounds which are selected from the list comprising hydroxides and salts of alkali metals.

In one embodiment of the disclosed liquid crystal display, the compensating structure comprises the single retardation layer which is characterized by two in-plane refractive indices (nf and ns) corresponding to a fast principal axis and a slow principal axis respectively, and one refractive index (nn) in the normal direction which obey the following conditions for electromagnetic radiation in the visible spectral range: ns>nf>nn.

In another embodiment of the disclosed liquid crystal display, at least one compensating structure is located between the liquid crystal cell and one of said polarizers. In yet another embodiment of the disclosed liquid crystal display, at least one compensating structure is located inside the liquid crystal cell. In still another embodiment of the disclosed liquid crystal display, at least two compensating structures located on each side of the liquid crystal cell.

In one embodiment of the present invention, a liquid crystal display further comprises an additional retardation layer which is characterized by two in-plane refractive indices (nf and ns) corresponding to a fast principal axis and a slow principal axis respectively, and one refractive index (nn) in the normal direction which obey the following conditions for electromagnetic radiation in the visible spectral range: ns=nf>nn. In still another embodiment of the disclosed liquid crystal display, at least one of the two polarizers comprises at least one retardation TAC-layer.

In order that the invention may be more readily understood, reference is made to the following examples, which are intended to be illustrative of the invention, but are not intended to be limiting the scope.

EXAMPLES

Example 1

This Example describes synthesis of poly(2,2'-disulfo-4,4'-benzidine terephthalamide) cesium salt (structure 3 in Table 2).

1.377 g (0.004 mol) of 4,4'-diaminobiphenyl-2,2'-disulfonic acid was mixed with 1.2 g (0.008 mol) of Cesium hydroxide and 40 ml of water and stirred with dispersing stirrer till dissolution. 0.672 g (0.008 mol) of sodium bicarbonate was added to the solution and stirred. While stirring the obtained solution at high speed (2500 rpm) the solution of 0.812 g (0.004 mol) of terephthaloyl dichloride in dried toluene (15 mL) was gradually added within 5 minutes. The stirring was continued for 5 more minutes, and viscous white emulsion was formed. Then the emulsion was diluted with 40 ml of water, and the stirring speed was reduced to 100 rpm. After the reaction mass has been homogenized the polymer was precipitated via adding 250 ml of acetone. Fibrous sediment was filtered and dried.

Gel permeation chromatography (GPC) analysis of the sample was performed with Hewlett Packard 1050 chromatograph with diode array detector ($\lambda$=230 nm), using Varian GPC software Cirrus 3.2 and TOSOH Bioscience TSKgel G5000 PW$_{XL}$ column and 0.2 M phosphate buffer (pH=7) as the mobile phase. Poly(para-styrenesulfonic acid) sodium salt was used as GPC standard. The number average molecular weight Mn, weight average molecular weight Mw, and polydispersity P were found as $3.9\times10^5$, $1.7\times10^6$, and 4.4 respectively.

Example 2

This Example describes synthesis of poly(2,2'-disulfo-4,4'-benzidine sulfoterephthalamide) (structure 4 in Table 2).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 13.77 g (40 mmol) of 4,4'-diaminobiphenyl-2,2'-disulfonic acid were added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 3

This Example describes synthesis of poly(para-phenylene sulfoterephthalamide) (structure 5 in Table 2).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 4.35 g (40 mmol) of 1,4-phenylenediamine were added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 4

This Example describes synthesis of poly(2-sulfo-1,4-phenylene sulfoterephthalamide) (structure 6 in Table 2).

10 g (40 mmol) of 2-sulfoterephtalic acid, 27.5 g (88.7 mmol) of triphenylphosphine, 20 g of Lithium chloride and 50 ml of pyridine were dissolved in 200 ml of N-methylpyrrolidone in a 500 ml three-necked flask. The mixture was stirred at 40° C. for 15 min and then 7.52 g (40 mmol) of 2-sulfo-1,4-phenylenediamine were added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 5

This Example describes synthesis of poly(2,2'-disulfo-4,4'-benzidine naphthalene-2,6-dicarboxamide) cesium salt (structure 7 in Table 2).

0.344 g (0.001 mol) of 4,4'-diaminobiphenyl-2,2'-disulfonic acid was mixed with 0.3 g (0.002 mol) of Cesium hydroxide and 10 ml of water and stirred with dispersing stirrer till dissolution. 0.168 g (0.002 mol) of sodium bicarbonate was added to the solution and stirred. While stirring the obtained solution at high speed (2500 rpm) the solution of 0.203 g (0.001 mol) of terephthaloyl dichloride in dried toluene (4 mL) was gradually added within 5 minutes. The stirring was continued for 5 more minutes, and viscous white emulsion was formed. Then the emulsion was diluted with 10 ml of water, and the stirring speed was reduced to 100 rpm. After the reaction mass has been homogenized the polymer was precipitated via adding 60 ml of acetone. The fibrous sediment was filtered and dried. Molecular weight analysis of the sample via GPC was performed as described in Example 1.

Example 6

This Example describes synthesis of 4,4'-(5,5-dioxidodibenzo[b,d]thiene-3,7-diyl)dibenzenesulfonic acid (structure 28 in Table 4).

1,1':4',1":4",1'''-quarerphenyl (10 g) was charged into 0%-20% oleum (100 ml). Reaction mass was agitated for 5 hours at heating to 50° C. After that the reaction mixture was diluted with water (170 ml). The final sulfuric acid concentration became approximately 55%. The precipitate was filtered and rinsed with glacial acetic acid (~200 ml). The filter cake was dried in an oven at 110° C.

HPLC analysis of the sample was performed with Hewlett Packard 1050 chromatograph with diode array detector ($\lambda$=310 nm), using Reprosil™ Gold C8 column and linear gradient elution with acetonitrile/0.4 M ammonium acetate (pH=3.5 acetic acid) aqueous solution.

Example 7

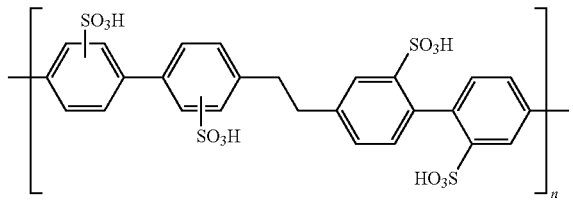

This example describes synthesis of poly(disulfobiphenylene-1,2-ethylene-2,2'-disulfobiphenylene) (structure 8 in Table 2).

Copper(I) bromide (0.3 g) was added to a suspension of iron powder (1.2 g) in water (30 mL). Then suspension was agitated at a room temperature for 20 min, the resulting mixture was heated up to 90° C. 4-Bromobenzyl bromide (10 g) was added by portions to the reaction mixture, and the mixture was stirred at 90° C. for 2 hours. After the mixture was cooled to the room temperature, the solid was filtered off and washed with hot water. Filter cake was dissolved in the boiling methanol. Hot solution was filtered and cooled to the room temperature.

Precipitate was filtered and dried on air. Yield 2.5 g.

5.4 ml of 2.5 M solution of butyllithium in hexane was added dropwise to a stirred solution of 3 g of 4,4'-dibromo-bibenzyl in 100 ml of dry tetrahydrofuran under argon at ±78° C. The mixture was stirred at this temperature for 6 hrs and a white suspension was received. 6 ml of triisopropylborate was added and the mixture was stirred overnight allowing the temperature to rise to room temperature. 30 ml of water was added and the mixture was stirred at room temperature for 4 hrs. The organic solvents were removed on a rotavapor (35° C., 40 mbar), then 110 ml of water was added and a mixture was acidified with concentrated HCl. The product was extracted into diethyl ether (7×30 ml), the organic layer dried over magnesium sulfate and the solvent was removed on a rotavapor. The residue was dissolved in 11 ml of acetone and reprecipitated into a mixture of 13 ml of water and 7 ml of concentrated hydrochloric acid. The yield of dipropyleneglycol ester of bibenzyl 4,4'-diboronic acid is 2.4 g.

100 g of 4,4'-diamino-2,2'-biphenyldisulfonic acid, 23.2 g of sodium hydroxide and 3.5 L of water were mixed and cooled down to 0-5° C. A solution of 41 g of sodium nitrite in 300 ml of water was added, stirred for 5 min and then 100 ml of 6M hydrochloric acid was added to the solution. A precooled solution of 71.4 g of potassium bromide in 300 ml of water was added to the resulting dark yellow solution in 2 ml portions. After potassium bromide was added the solution was allowed to warm up to room temperate. Then the reaction mixture was heated and held at 90° C. for 16 hours. A solution of 70 g of sodium hydroxide in 300 ml of water was added, the solution evaporated to a total volume of 400 ml, diluted with 2.5 L of methanol to precipitate the inorganic salts and filtered. Methanol was evaporated to 20-30 ml and 3 L of isopropanol was added. The precipitate was washed with methanol on a filter and recrystallized from methanol. Yield of 4,4'-dibromo-2,2'-biphenyldisulfonic acid was 10.7 g.

Polymerization was carried out under nitrogen. 2.7 g of 4,4'-dihydroxy-2,2'-biphenyldisulfonic acid and 2.0 g of dipropyleneglycol ester of bibenzyl 4,4'-diboronic acid were dissolved in a mixture of 2.8 g of sodium hydrocarbonate, 28.5 ml of tetrahydrofuran and 17 ml of water. Tetrakis(triphenylphosphine)palladium(0) was added ($5 \times 10^{-3}$ molar equivalent compared to dipropyleneglycol ester of bibenzyl 4,4'-diboronic acid). The resulting suspension was stirred for 20 hrs. 0.04 g of bromobenzene was then added. After an additional 2 hrs a polymer was precipitated by pouring it into 150 ml of ethanol. The product was washed with water, dried and dissolved in toluene. A filtered solution was concentrated and a polymer was precipitated in a 5-fold excess of ethanol and dried. The yield of polymer was 2.7 g.

8.8 g of 95% sulfuric acid was heated to 110° C. and 2.7 g of the polymer was added. Temperature was raised to 140° C. and was held for 4 hours. After cooling down to 100° C. 8 ml of water was added dropwise and mixture was allowed to cool. A resulting suspension was filtered, washed with concentrated hydrochloric acid and dried. The yield of the sulfonated polymer was ~2 g.

Example 8

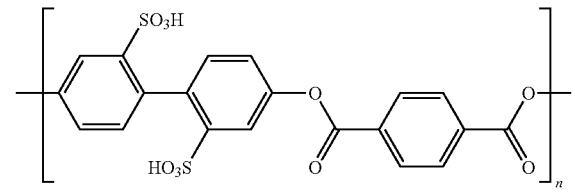

This example describes synthesis of poly(2,2'-disulfobiphenyl-dioxyterephthaloyl) (structure 9 in Table 2).

1.384 g (0.004 mol) of 4,4'-dihydroxybiphenyl-2,2'-disulfonic acid was mixed with 2.61 g (0.008 mol) of sodium carbonate and 40 ml of water in 500 ml beaker and stirred with dispersing stirrer until the solid was completely dissolved. Dichloromethane (50 ml) was added to the solution. Upon stirring at high speed (7000 rpm) the solution of 0.812 g (0.004 mol) of terephthaloyl chloride in anhydrous dichloromethane (15 ml) was added. Stirring was continued for 30 minutes and 400 ml of acetone were added to the thickened reaction mass. Solid polymer was crushed with the stirrer and separated by filtration. The product was washed three times with 80% ethanol and dried at 50° C.

Example 9

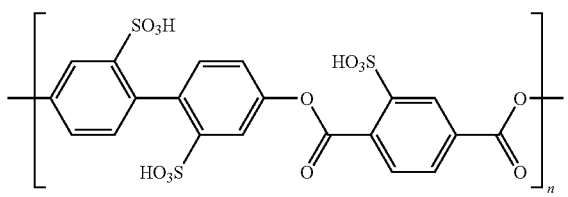

This example describes synthesis of poly(2,2'-disulfobiphenyl-2-sulfodioxyterephthaloyl) (structure 10 in Table 2).

1.384 g (0.004 mol) of 4,4'-dihydroxybiphenyl-2,2'-disulfonic acid was mixed with 3.26 g (0.010 mol) of sodium carbonate and 40 ml of water in 500 ml beaker and stirred with dispersing stirrer until the solid completely dissolved. Dichloromethane (60 ml) was added to the solution. Upon stirring at high speed (7000 rpm) 1.132 g (0.004 mol) of 2-sulfoterephthaloyl chloride was added within 15 minutes. Stirring was continued for 3 hours and 400 ml of acetone were added to the thickened reaction mass. Precipitated polymer was separated by filtration and dried at 50° C.

Example 10

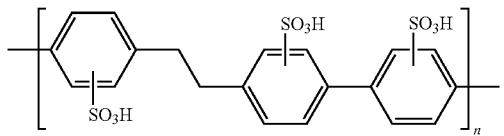

This example describes synthesis of poly(sulfophenylene-1,2-ethylene-2,2'-disulfobiphenylene) (structure 11 in Table 2).

The 4,4'-dibromobibenzyl was prepared as described in Example 7.

A solution of 23.6 g of 1,4-Dibromobenzene in 90 ml of dry tetrahydrofuran was prepared. 10 ml of the solution was added with stirring to 5.0 g of magnesium chips and iodine (a few crystals) in 60 ml of dry tetrahydrofuran and a mixture was heated until reaction starts. Boiling conditions were maintained by the gradual addition of the rest of dibromobenzene solution. Then the reaction mixture was boiled for 8 hours and left overnight under argon at room temperature. The mixture was transferred through a hose to a dropping funnel by means of argon pressure and added to a solution of 24 ml of trimethylborate in 40 ml of dry tetrahydrofuran during 3 h at −78-70° C. (solid carbon dioxide/acetone bath) and vigorous stirring. The mixture was stirred for 2 hrs, then allowed to heat to room temperature with stirring overnight under argon. The mixture was diluted with 20 ml of ether and was poured to a stirred mixture of crushed ice (200 g) and conc. $H_2SO_4$ (6 ml). In order to facilitate the separation of organic and aqueous layers the amounts of 20 ml of ether and 125 ml of water was added to the mixture and than the mixture was filtered. The aqueous layer was extracted with ether (4×40 ml), the combined organic extracts were washed with 50 ml of water, dried over sodium sulfate and evaporated to dryness. The light brown solid was dissolved in 800 ml of chloroform and clarified.

The chloroform solution was almost completely evaporated and the residual solid was recrystallized from benzene. A white slightly yellowish precipitate was filtered off and dried. The yield of dipropyleneglycol ester of benzyne 1,4-diboronic acid was 0.74 g.

Polymerization was carried out under nitrogen. 2.7 g of 4,4'-dibromo-2,2'-bibenzyl and 1.9 g of dipropyleneglycol ester of benzyne 1,4-diboronic acid were added to a mixture of 2.8 g of sodium hydrocarbonate, 28.5 ml of tetrahydrofuran and 17 ml of water. Tetrakis(triphenylphosphine)palladium(0) was added ($5 \times 10^{-3}$ molar equivalent compared to dipropyleneglycol ester of benzyne 1,4-diboronic acid). The resulting suspension was stirred for 20 hrs. 0.04 g of bromobenzene was then added. After 2 more hours the polymer was precipitated by pouring it into 150 ml of ethanol. The product was washed with water, dried and dissolved in toluene. The filtered solution was concentrated and a polymer was precipitated in a 5-fold excess of ethanol and dried. The yield of polymer was 2.5 g.

8.8 g of 95% sulfuric acid was heated to 110° C. and 2.7 g of a polymer was added. Temperature was raised to 140° C. and held for 4 hours. After cooling down to the room temperature 8 ml of water was added dropwise and the mixture was allowed to cool. The resulting suspension was filtered, washed with concentrated hydrochloric acid and dried. Yield of the sulfonated polymer was 1.5 g.

Example 11

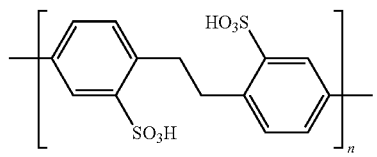

This example describes synthesis of poly(2-sulfophenylene-1,2-ethylene-2'-sulfophenylene) (structure 12 in Table 2).

Polymerization was carried out under nitrogen. 10.2 g of 2,2'-[ethane-1,2-diylbis(4,1-phenylene)]bis-1,3,2-dioxaborinane, 10.5 g of 1,1'-ethane-1,2-diylbis(4-bromobenzene) and 1 g of tetrakis(triphenylphosphine)palladium(0) were mixed under nitrogen. Mixture of 50 ml of 2.4 M solution of potassium carbonate and 300 ml of tetrahydrofuran was degassed by nitrogen bubbling. Obtained solution was added to the first mixture. After that a reaction mixture was agitated at ±40° C. for 72 hours. The polymer was precipitated by pouring it into 150 ml of ethanol. The product was washed with water and dried. The yield of polymer was 8.7 g.

8.5 g of polymer was charged into 45 ml of 95% sulfuric acid. Reaction mass was agitated at ~140° C. for 4 hours. After cooling down to the room temperature 74 ml of water was added dropwise and the mixture was allowed to cool. The resulting suspension was filtered, washed with concentrated hydrochloric acid and dried. Yield of the sulfonated polymer was 8 g.

Example 12

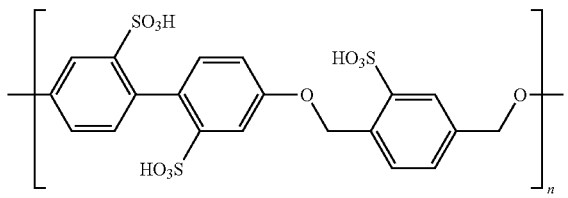

This example describes synthesis of poly(2,2'-disulfobiphenyl-2-sulfo-1,4-dioxymethylphenylene) (structure 13 in Table 2).

190 g of 4,4'-diaminobiphenyl-2,2'-disulfonic acid and 41.5 g of sodium hydroxide were dissolved in 1300 ml of water. 1180 g of ice was charged to the solution with stirring. Then 70.3 g of sodium nitrite, 230 ml of sulfuric acid and 1180 ml of water was added to the reaction mass and stirred for 1 hr at temperature from −2 to 0° C. Then it was filtered and washed with 2.4 L of icy water. The filter cake was suspended in 800 ml of water and heated to 100° C. Then water was distilled out until about ~600 ml solution remained. 166 g of cesium hydroxide hydrate in 110 ml of water was added to the solution. Then it was added to 6 L of ethanol, the resulting suspension was stirred at room temperature, filtered and a filter cake washed with 600 ml of ethanol and dried in vacuum oven at 45° C. The yield of 4,4'-dihydroxybiphenyl-2,2'-disulfonic acid was 230 g.

30 ml of 96% Sulfuric acid and 21 g of p-xylene were mixed, heated to 100° C. and kept at temperature for 15 min. The reaction mass was cooled to room temperature, quenched with 50 g water and ice. The resulting suspension was cooled to −10° C., filtered and the obtained filter cake was washed with cold hydrochloric acid (15 ml of conc. acid and 10 ml of water). The precipitate was squeezed and recrystallized from hydrochloric acid solution (40 ml of concentrated acid and 25 ml of water). The white substance was dried under vacuum at 90° C. The yield of p-xylene sulfonic acid was 34 g.

A mixture of 35 ml of carbon tetrachloride, 2.5 g of p-xylene sulfonic acid, 4.8 g of N-bromosuccinimide and 0.16 g of benzoyl peroxide were heated with agitation to boiling and held at temperature 60 min. Then additional 0.16 g of benzoyl peroxide was added and a mixture was kept boiling for additional 60 min. After cooling the product was extracted with 45 ml of water and recrystallized form 20% hydrochloric acid. The yield of 2,5-bis(bromomethyl)benzene sulfonic acid was approximately 1 g.

0.23 g of 4,4'-dihydroxybiphenyl-2,2'-disulfonic acid, 1.2 ml of o-dichlorobenzene, 0.22 g of 2,5-bis(bromomethyl) benzene sulfonic acid, 1.2 ml of 10N sodium hydroxide, and 0.081 g of tetrabutylammonium hydrogen sulfate were successively added to a 25-ml flask equipped with a condenser and nitrogen inlet-outlet. The reaction mixture was stirred at 80° C. under nitrogen. After 6 hrs of reaction the organic layer was isolated and washed with water, followed by dilute hydrochloric acid, and once again with water. Then solution was added to methanol to precipitate a white polymer. The polymer is then reprecipitated from acetone and methanol.

Example 13

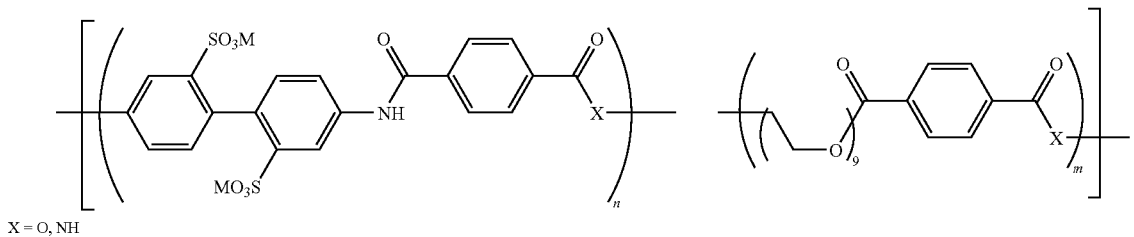

X = O, NH

This example describes synthesis of copolymer of 2,2'-disulfo-4,4'-benzidine terephthaloylchloride and polyethylene glycol 400 (structure 3 in Table 2 added with chains of polyethylene glycols, where M is hydrogen). 4,4'-diaminobiphenyl-2,2'-disulfonic acid (4.1 g) was mixed with Cesium hydroxide hydrate (4.02 g, 2.0 equiv) in water (150 ml) in a 1 L beaker and stirred until the solid was completely dissolved. Cesium bicarbonate (3.9 g, 1.0 equiv) dissolved in 10 ml of water was added to the solution and stirred with an electric mixer at room temperature during 1 min. Chloroform (40 ml) and polyethylene glycol 400 (8.0 g) were added. Upon stirring at high speed a solution of terephthaloylchloride (2.42 g, 1.0 equiv) in 10 ml of chloroform was added in one portion pouring from the beaker. The reaction was left without stirring at ambient conditions for 30 minutes. 300 ml of ethanol was added, thickened reaction mass was crushed with the stirrer and polymer was filtered. The product was suspended in 200 ml of 80% ethanol, stirred for 15 min and filtered. Washing with ethanol was repeated one more time. The product was washed with 200 ml of acetone in a similar way. Solid copolymer was dried at 85° C. for 14 hrs.

The introduction of ethylene oxide fragment into rigid-core polymer allows modification of macromolecule elasticity, which in its turn improves phases' coexistence in guest-host mixture.

Example 14

This Example describes preparation of a solid optical retardation layer of +A-type from a lyotropic liquid crystal solution of poly(2,2'-disulfo-4,4'-benzidine terephthalamide) (structure 3 in Table 2) cesium salt.

Poly(2,2'-disulfo-4,4'-benzidine terephthalamide) was synthesized as described in Example 1. The lyotropic liquid crystal solution was prepared according to the following procedure: 1% water solution was prepared, filtered from mechanical admixtures, and concentrated to approximately 5.6 wt. % via evaporation. Typical polarized microscopy image of LLC solution is presented in FIG. 1.

Fisher-brand microscope glass slides were treated with a 10% sodium hydroxide solution for 30 min, followed by rinsing with deionized water and drying in airflow with the aid of a compressor. The solution was applied onto the glass plate surface with a Mayer rod #4 moved at a linear velocity of ~100 mm/s at room temperature of 23° C. and a relative humidity of 50%. The coated liquid layer of the solution was dried at the same humidity and temperature.

Figure 2:
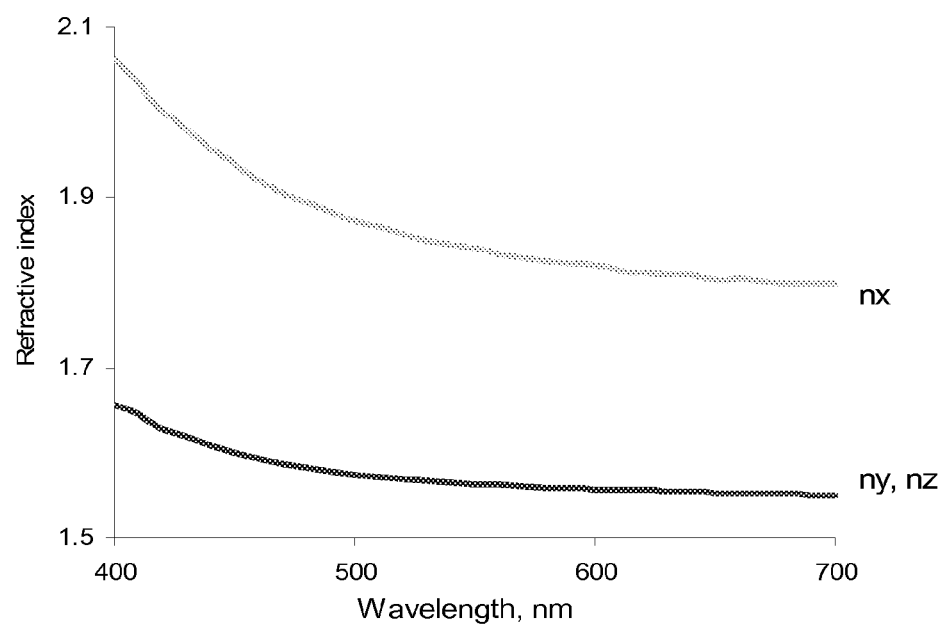
FIG. 2 shows the refractive index spectra of the organic retardation layer prepared from poly(2,2'-disulfonyl-4,4'-benzidine terephthalamide) (6.0% solution) on a glass substrate.

In order to determine the optical characteristics of the solid retardation layer, the optical transmission and reflection spectra were measured in a wavelength range from approximately 400 to 700 nm using a Cary 500 Scan spectrophotometer. The optical transmission of the solid retardation layer was measured using light beams linearly polarized being parallel and perpendicular to the coating direction ($T_{par}$ and $T_{per}$, respectively), propagating in direction perpendicular to the retardation film plane. The optical reflection was measured using S-polarized light propagating at an angle of 12 degree to the normal of the retardation film plane and polarized parallel and perpendicular to the coating direction ($R_{par}$ and $R_{per}$, respectively). The phase retardation of the retardation film samples was measured at incident angles of 0, 30, 45 and 60 degrees using Axometrics Mueller Matrix polarimeter. The obtained data were used to calculate the principal refractive indices ($n_x$, $n_y$, and $n_z$) of the retardation film as presented in FIG. 2. The obtained solid retardation layer was characterized as a positive A-plate ($n_x$=1.83, $n_y$=1.55, $n_z$=1.55 at the wavelength $\lambda$=550 nm).

Example 15

This Example describes preparation of a solid optical retardation layer of $B_A$-type from a solution of 4,4'-(5,5-dioxidodibenzo[b,d]thiene-3,7-diyl)dibenzenesulfonic acid (structure 28 in Table 4).

Figure 3:
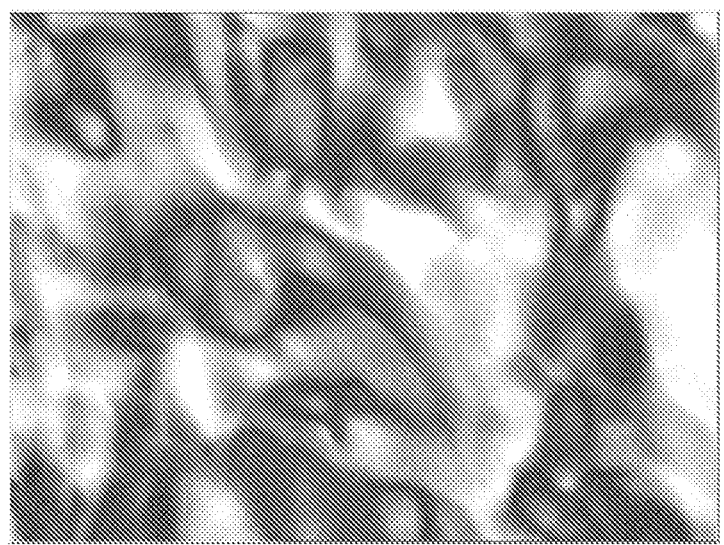
FIG. 3 shows a polarizing microscopy image of the lyotropic liquid crystal solution texture of 4,4'-(5,5-dioxidodibenzol[b,d]thiene-3,7-diyl)dibenzensulfonic acid cesium salt (concentration is approximately 10 wt. %)

4,4'-(5,5-dioxidodibenzo[b,d]thiene-3,7-diyl)dibenzenesulfonic acid (1 g) was obtained as described in Example 6, mixed with 5.8 g of distilled water and 3.2 g of 20% aqueous solution of cesium hydroxide, and then stirred at room temperature (23° C.) for approximately 1 hour until a lyotropic liquid crystal solution was formed. The polarized microscopy image of LLC solution is presented in FIG. 3.

Figure 4:
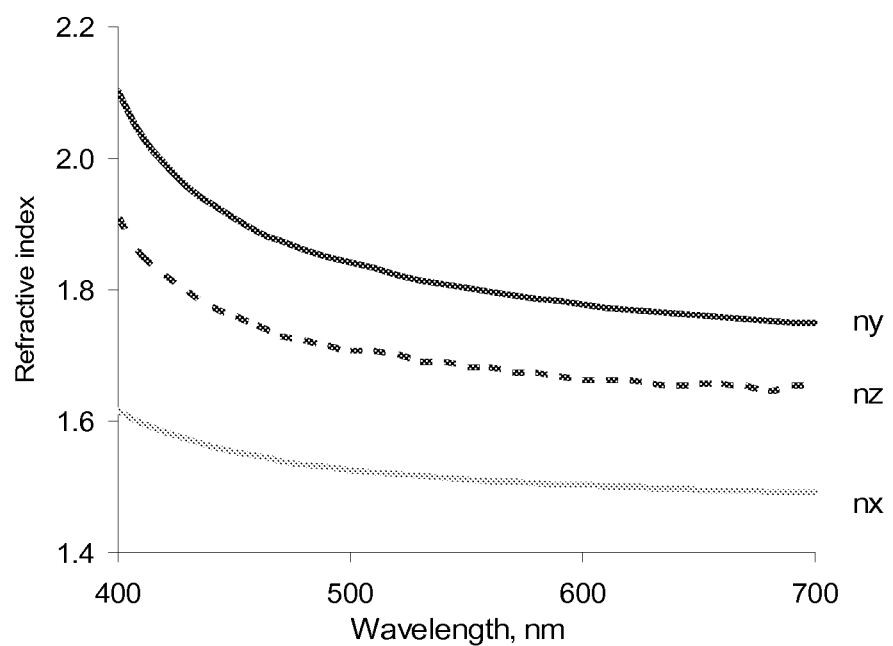
FIG. 4 shows the refractive index spectra of the organic retardation layer prepared from 4,4'-(5,5-dioxidodibenzol[b,d]thiene-3,7-diyl)dibenzensulfonic acid cesium salt (10% solution) on a glass substrate.

The coatings were produced and optically characterized as described in Example 14. The principal refractive index spectral dependences of the retardation film are presented in FIG. 4. The obtained solid optical retardation layer was characterized by the principle refractive indices, which obey the following condition: $n_x < n_z < n_y$. NZ-factor at the wavelength $\lambda$=550 nm is about 0.4.

Example 16

This Example describes preparation of a solid optical retardation layer of −A-type from a solution of (4,4'-(5,5-dioxidodibenzo[b,d]thiene-3,7-diyl)dibenzenesulfonic acid (structure 28 in Table 4).

Figure 5:
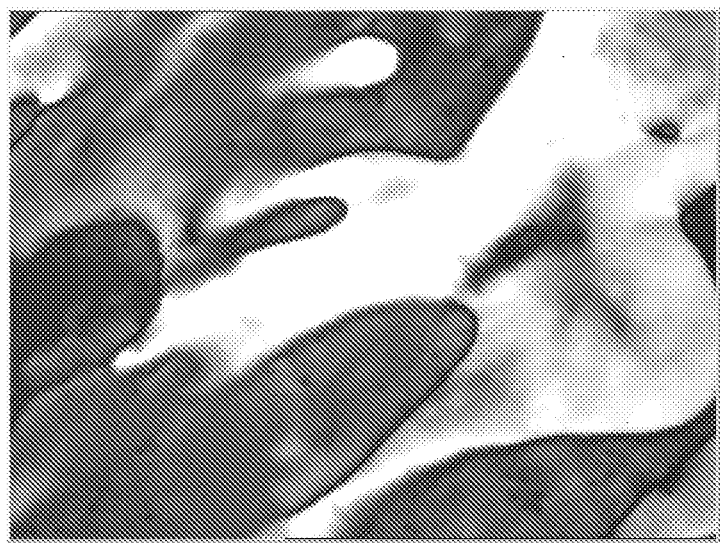
FIG. 5 shows a polarizing microscopy image of the lyotropic liquid crystal solution texture of 4,4'-(5,5-dioxidodibenzol[b,d]thiene-3,7-diyl)dibenzensulfonic acid lithium salt (concentration is approximately 15 wt. %)

4,4'-(5,5-dioxidodibenzo[b,d]thiene-3,7-diyl)dibenzenesulfonic acid (1 g) was obtained as described in Example 6, mixed with 8.5 g of distilled water and 0.5 g of 20% aqueous solution of lithium hydroxide, and then stirred at room temperature (23° C.) for approximately 1 hour until a lyotropic liquid crystal solution was formed. Typical polarized microscopy image of LLC solution is presented in FIG. 5.

Figure 6:
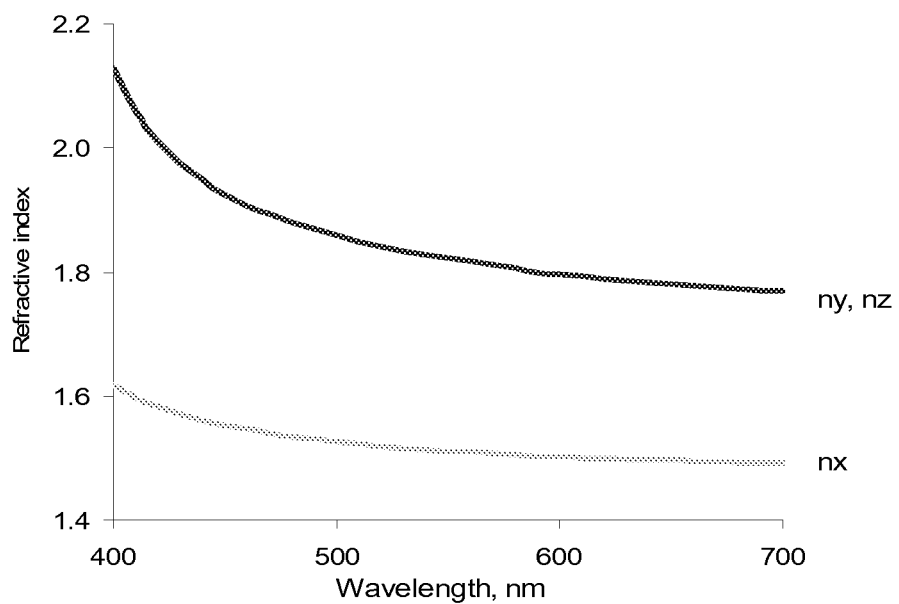
FIG. 6 shows the refractive index spectra of the organic retardation layer prepared from 4,4'-(5,5-dioxidodibenzol[b,d]thiene-3,7-diyl)dibenzensulfonic acid lithium salt (15% solution) on a glass substrate.

The coatings were produced and optically characterized as described in Example 14. The principal refractive index spectral dependences are presented in FIG. 6. The obtained solid optical retardation layer was characterized by the principle refractive indices, which obey the following condition: $n_x < n_z = n_y$. NZ-factor at the wavelength $\lambda$=550 nm is about 0.

Example 17

This Example describes preparation of a solid optical retardation layer of $A_C$-type from a solution comprising a binary composition of poly(2,2'-disulfo-4,4'-benzidine terephthalamide) (structure 3 in Table 2) acid denoted hereafter as P1, and (4,4'-(5,5-dioxidodibenzo[b,d]thiene-3,7-diyl)dibenzenesulfonic acid denoted hereafter as C1 (structure 28 in Table 4). Said composition of organic compounds is capable of forming a joint lyotropic liquid crystal system. The rigid rod-like macromolecules of P1 are capable of aligning together with π-π (stacks (columns) of board-like supramolecules C1.

Figure 7:
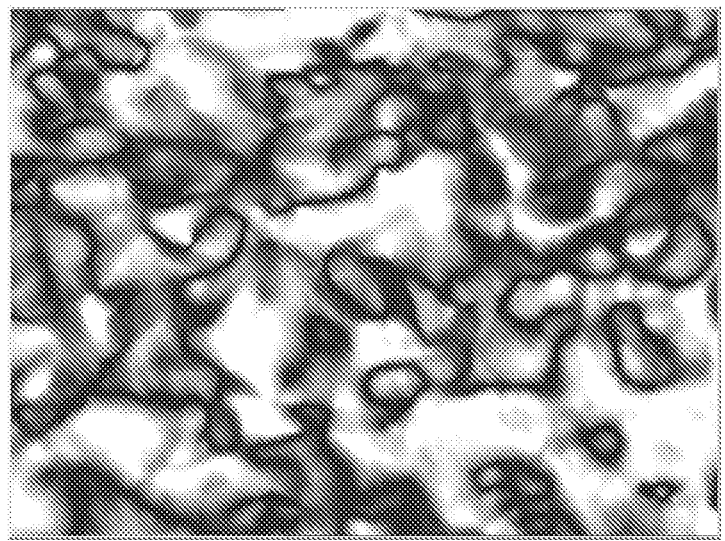
FIG. 7 shows a polarizing microscopy image of the lyotropic liquid crystal solution texture of composition of poly(2,2'-disulfonyl-4,4'-benzidine terephthalamide) and 4,4'-(5,5-dioxidodibenzol[b,d]thiene-3,7-diyl)dibenzensulfonic acid cesium salts (total concentration is approximately 8 wt. %)

The P1/C1=70/30 molar % composition was prepared as follows: 5.18 g (0.007 mol) of cesium salt of P1 was dissolved in 515 g of de-ionized water (conductivity ~5 µSm/cm); the suspension was mixed with a magnet stirrer. After dissolution, the solution was filtered with the hydrophilic nylon filter with pore size of 45 µm. Separately, 1.59 g (0.003 mol) of Cl was dissolved in 50 g of de-ionized water; the suspension was mixed with a magnet stirrer. While stirring, 3.75 ml (0.006 mol) of 20 wt. % CsOH was gradually added drop-by-drop into suspension for approximately 15 minutes until a clear solution was formed. Clear solutions of P1 and C1 were mixed together to form 575 g of a clear solution. This composition was concentrated on a rotary evaporator in order to remove an excess of water and form 95 g of a binary composition representing a lyotropic liquid crystal (LLC) solution. The total concentration of composition (P1+C1) $C_{TOT}$ was equal to 8%. Typical polarized microscopy image of LLC solution is presented in FIG. 7.

Figure 8:
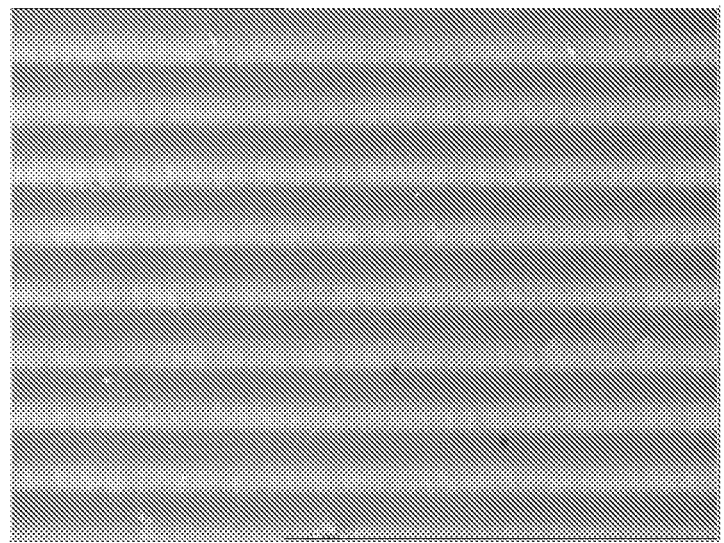
FIG. 8 shows a polarizing microscopy image of the optical film comprising solid optical retardation layer produced with Mayer rod coating method and comprising a composition of poly(2,2'-disulfonyl-4,4'-benzidine terephthalamide) and 4,4'-(5,5-dioxidodibenzol[b,d]thiene-3,7-diyl)dibenzensulfonic acid cesium salts.
Figure 9:
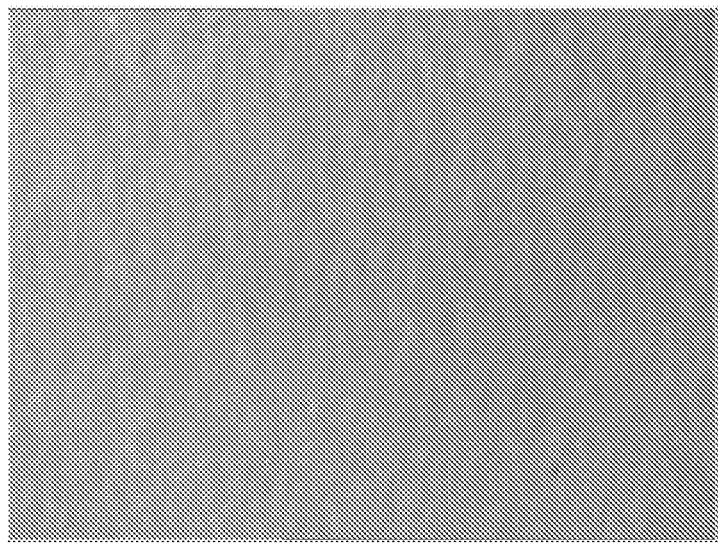
FIG. 9 shows a polarizing microscopy image of the optical film comprising solid optical retardation layer produced with slot-die coating method and comprising a composition of poly(2,2'-disulfonyl-4,4'-benzidine terephthalamide) and 4,4'-(5,5-dioxidodibenzol[b,d]thiene-3,7-diyl)dibenzensulfonic acid cesium salts.

The coatings were produced and optically characterized as described in Example 14. Fisher brand microscope glass slides were prepared for coating by soaking in a 10% NaOH solution for 30 min, followed by rinsing with deionized water, and drying in airflow with the compressor. At temperature of 22° C. and relative humidity of 55% the obtained LLC solution was applied onto the glass panel surface with a Gardner® wired stainless steel rod #8, which was moved at a linear velocity of about 100 mm/s. The optical film was dried with a flow of the compressed air. Typical polarized microscopy image of the optical film is presented in FIG. 8. The polarized microscopy image of the optical film coated by slot-die technique is presented in FIG. 9.

Figure 10:
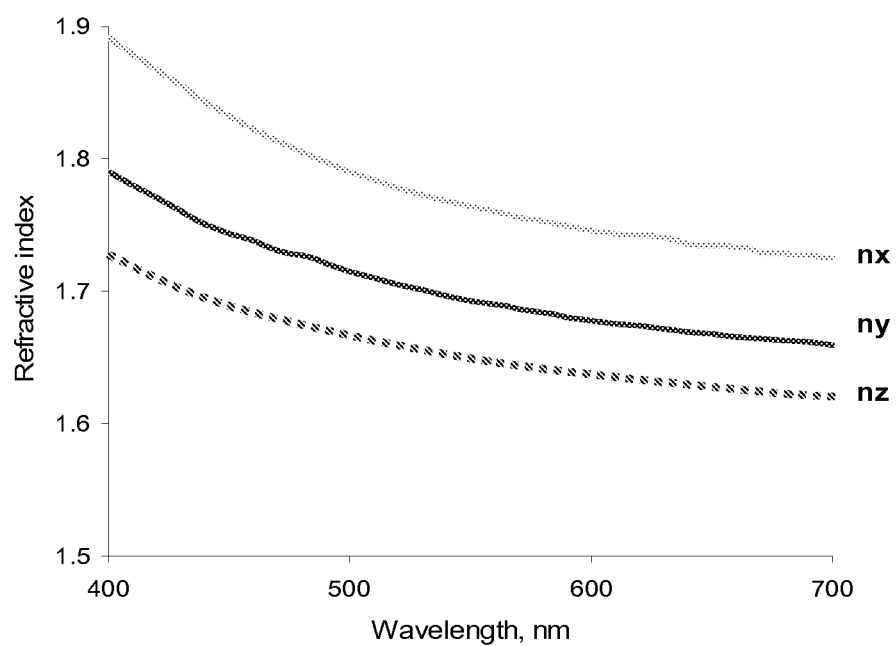
FIGS. 10-16 show the refractive index spectra of the organic retardation layers prepared from the composition of poly(2,2'-disulfonyl-4,4'-benzidine terephthalamide) and 4,4'-(5,5-dioxidodibenzol[b,d]thiene-3,7-diyl)dibenzensulfonic acid cesium salts (aqueous solutions) on a glass substrate.

The coatings were optically characterized as described in Example 14. The principal refractive index spectral dependences of the retardation film are presented in FIG. 10. Two principal directions for refractive indices $n_x$ and $n_y$ belong to xy-plane coinciding with a plane of the retardation layer and one principal direction for refractive index $n_z$ coincides with a normal line to the compensation panel. The obtained solid optical retardation layer was characterized by the principle refractive indices, which obey the following condition: $n_z < n_y < n_x$. The NZ-factor at the wavelength $\lambda$=550 nm was equal to about 1.5.

Figure 11:
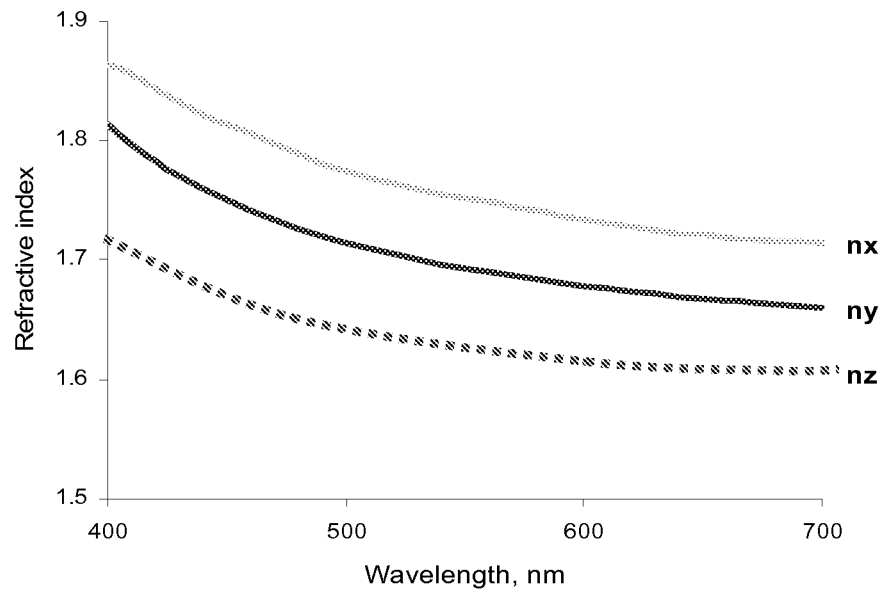

FIG. 11 shows principal refractive indices ($n_x$, $n_y$, and $n_z$) of a solid optical retardation layer prepared from a solution comprising a binary composition of the compounds P1 and C1. The NZ-factor at the wavelength $\lambda$=550 nm was equal to about 2.0. In this case the ratio P1/C1 was equal to 66/34 and total concentration of composition (P1+C1) $C_{TOT}$ was equal to about 8%.

Figure 12:
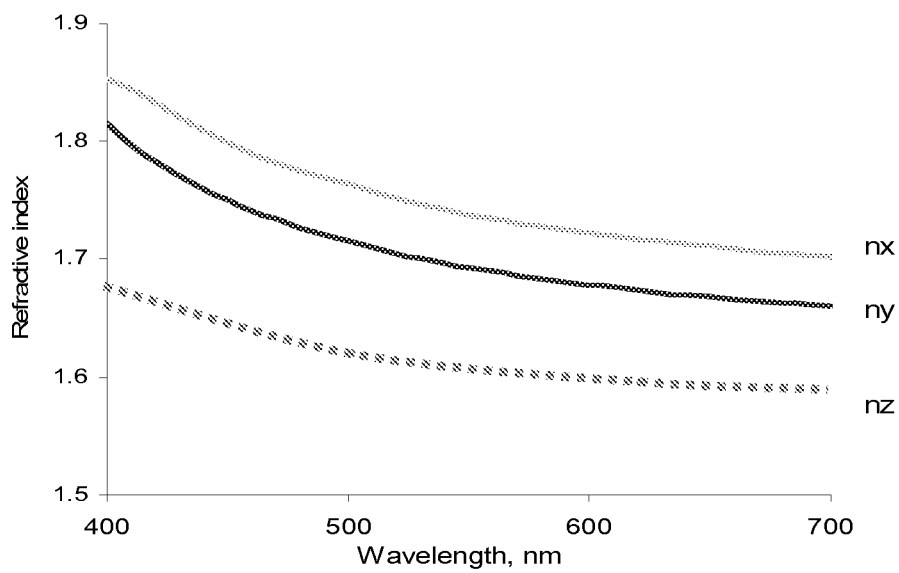

FIG. 12 shows principal refractive indices ($n_x$, $n_y$, and $n_z$) of a solid optical retardation layer prepared from a solution comprising a binary composition of the compounds P1 and C1. The NZ-factor at the wavelength λ=550 nm was equal to about 3.0. In this case the ratio P1/C1 was equal to about 60/40 and total concentration of composition (P1+C1) $C_{TOT}$ was equal to about 8%.

Example 18

This Example describes the preparation of a solid optical retardation layer of $B_A$-type from a solution comprising a composition of the organic compounds P1 and C1 described in Example 17.

The P1/C1=38/62 molar % composition was prepared as follows: 2.81 g (0.0038 mol) of the cesium salt of P1 was dissolved in 70 g of de-ionized water (conductivity ~5 μSm/cm); the suspension was mixed with a magnet stirrer. After dissolution, the solution was filtered at the hydrophilic nylon filter with pore size 45 μm. Separately, 3.28 g (0.0062 mol) of C1 was dissolved in 103 g of de-ionized water; suspension was mixed with a magnet stirrer. While stirring, 7.75 ml of 20 wt. % Cesium hydroxide was gradually added drop-by-drop into the suspension for approximately 15 minutes until a clear solution was formed. Clear solutions of P1 and C1 were mixed together to form 400 g of a clear solution. This composition was concentrated on a rotary evaporator in order to remove an excess of water and form 70 g of a binary composition representing a lyotropic liquid crystal (LLC) solution. The total concentration of composition (P1+C1) $C_{TOT}$ was equal to about 11%.

Figure 13:
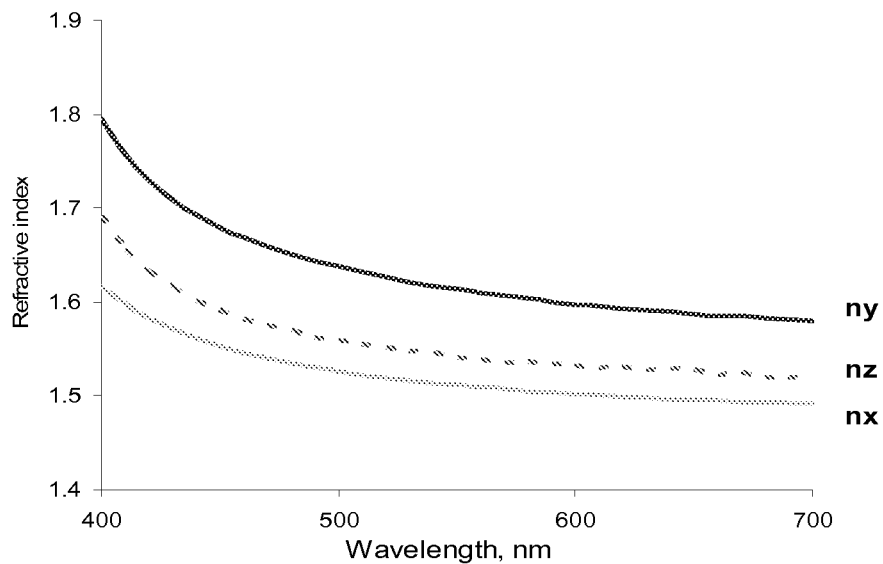

The coatings were produced and optically characterized as described in Example 17. The principal refractive indices spectral dependences of a solid optical retardation layer prepared from a solution are presented in FIG. 13. The obtained retardation layer was characterized by the principle refractive indices, which obey the following condition: $n_x < n_z < n_y$. The NZ-factor at the wavelength λ=550 nm is equal to about 0.75.

Figure 14:
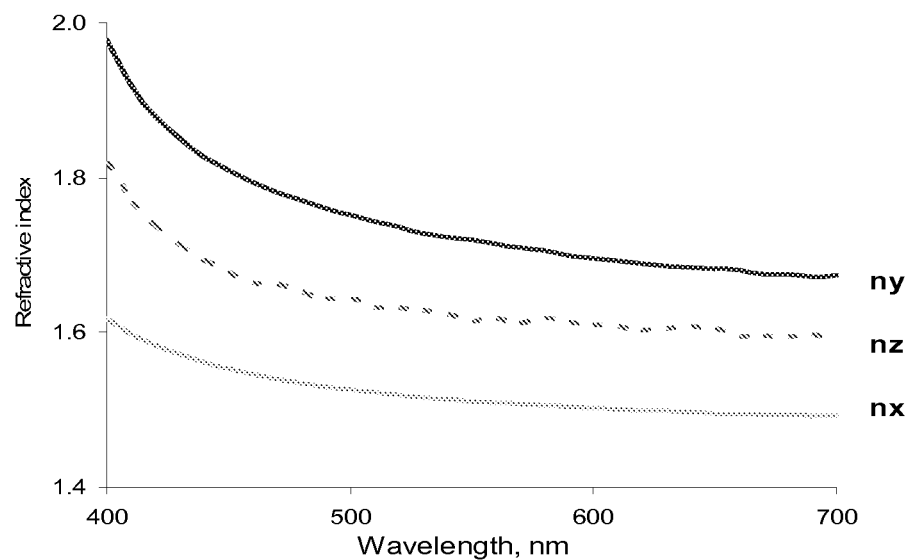

FIG. 14 shows principal refractive indices ($n_x$, $n_y$, and $n_z$) of a solid optical retardation layer prepared from a solution comprising a binary composition of the compounds P1 and C1. NZ-factor at the wavelength λ=550 nm is equal to about 0.5. In this case the ratio P1/C1 was equal to about 15/85 and total concentration of composition (P1+C1) $C_{TOT}$ was equal to about 11%.

Figure 15:
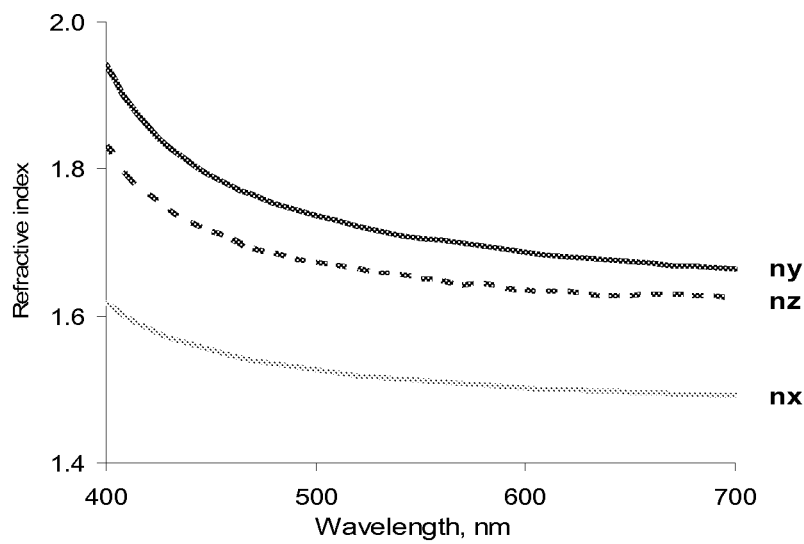

FIG. 15 shows principal refractive indices ($n_x$, $n_y$, and $n_z$) of a solid optical retardation layer prepared from a solution comprising a triple composition of a cesium salt of compound P1 ("+A component"), a cesium salt of compound C1 ("$B_A$ component") and a lithium salt of compound C1 ("−A component"), taken in molar ratio of approximately 16/42/42. The NZ-factor at the wavelength λ=550 nm is equal to about 0.3. The weight concentration of composition (P1+C1) $C_{TOT}$ was about 13%.

Example 19

This Example describes the preparation of a solid optical retardation layer of −A-type from a solution comprising a binary composition of the same organic compounds P1 and C1 as described in Example 17.

The P1/C1=15/85 molar % composition was prepared as follows: 1.48 g (0.002 mol) of the cesium salt of P1 was dissolved in 50 g of de-ionized water (conductivity ~5 μSm/cm); the suspension was mixed with a magnet stirrer. After dissolution, the solution was filtered at the hydrophilic nylon filter with pore size 45 μm. Separately, 6.12 g (0.0113 mol) of C1 compound was dissolved in 100 g of de-ionized water, and the suspension was mixed with a magnet stirrer. While stirring, 3.05 g of 20 wt. % Lithium hydroxide was gradually added drop-by-drop into the suspension for approximately 15 minutes until a clear solution was formed. Clear solutions of P1 and C1 were mixed together to form 180 g of a clear solution. This composition was concentrated on a rotary evaporator in order to remove an excess of water and form 43 g of a binary composition making a lyotropic liquid crystal (LLC) solution. The total concentration of composition (P1+C1) $C_{TOT}$ was about 15%.

Figure 16:
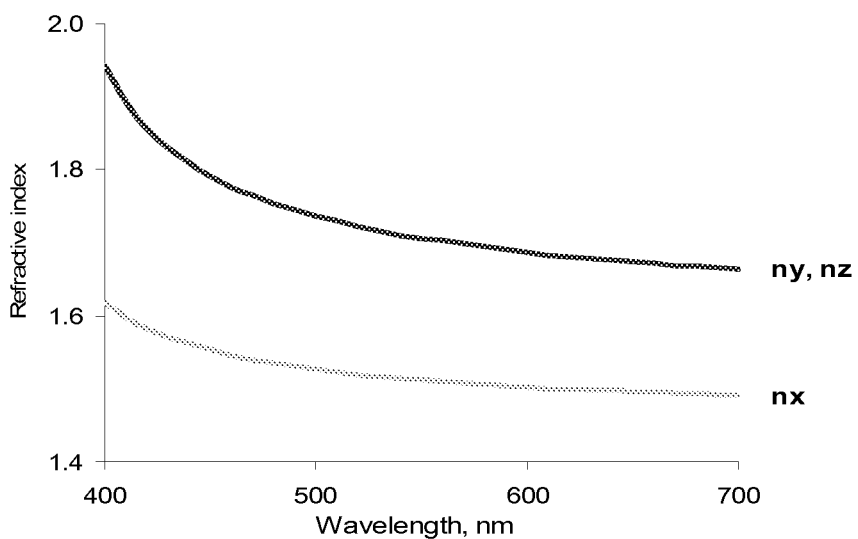

The coatings were produced and optically characterized, as was described in Example 17. The principal refractive index spectral dependences of a solid optical retardation layer prepared from a solution are presented in FIG. 16. The obtained solid optical retardation layer was characterized by the principle refractive indices, which obey the following condition: $n_x < n_z < n_y$. The NZ-factor at the wavelength λ=550 nm is about 0.

Thus, the principle of the control of the retardation layer type is based on mixing at least one component of the first type and at least one component of the second type, wherein separately said components are capable of forming optical retardation layers of different types.

Figure 17A:
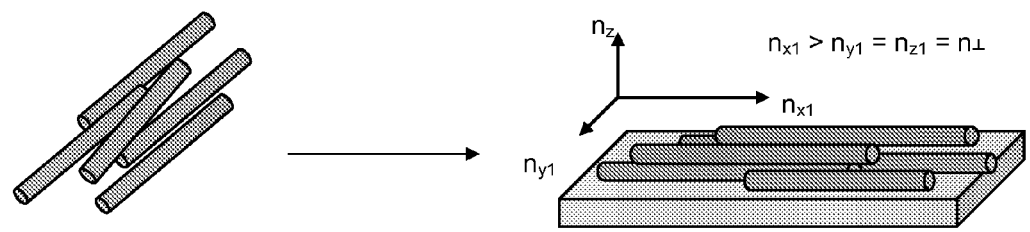
FIGS. 17a-d illustrate the control of the retardation layer type.

The compound of the first type represents rigid polymeric molecule capable of forming a lyotropic liquid crystal solution which is capable of forming an optical retardation layer of uniaxial +A-plate type (FIG. 17a), wherein refractive indices $n_{x1}$, $n_{y1}$ and $n_{z1}$ satisfy the following condition:

$$n_{x1} > n_{y1} = n_{z1} = n\perp_1. \quad (V)$$

Figure 17B:
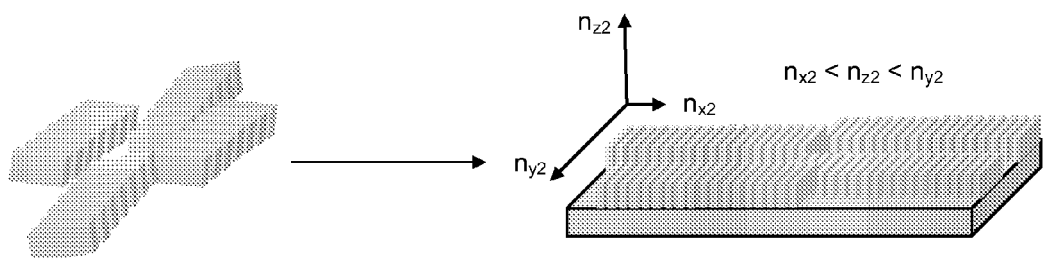
Figure 17C:
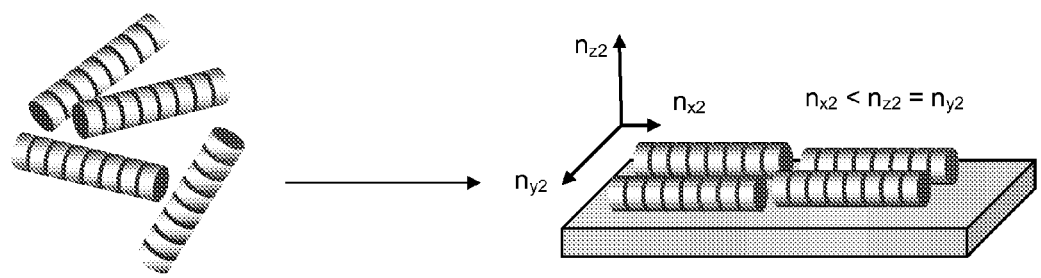

The compound of the second type is capable of forming a lyotropic liquid crystal solution which is capable of forming optical retardation layer of biaxial $B_A$-type (FIG. 17b) or uniaxial −A-type (FIG. 17c), wherein refractive indices $n_{x2}$, $n_{y2}$ and $n_{z2}$ satisfy the following condition:

$$n_{x2} < n_{z2} \leq n_{y2} \quad (VI)$$

Figure 17D:
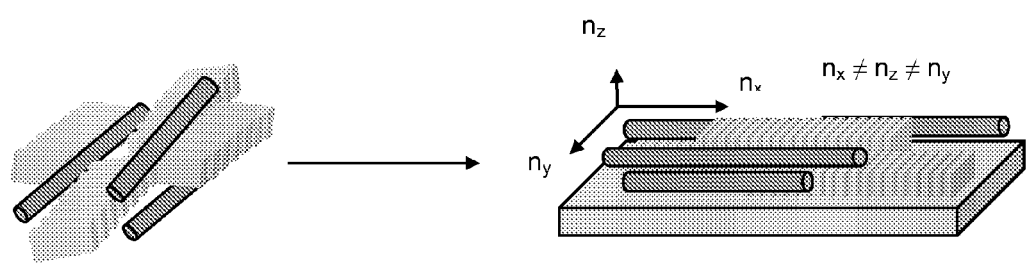

When mixed, the joint LLC solution of guest-host type is formed. The joint LLC solution can be coated onto the substrate and being ordered by a shear stress in the same way as individual LLC solutions of the compounds of the first and second types. In general case the joint LLC solution forms an optical retardation layer of biaxial type (FIG. 17d). Correlation between the principal refractive indices of the solid optical retardation layer is controlled by molar ratio of the components of the first and second types in the joint lyotropic liquid crystal solution. The solution enriched with compound of the first type forms a solid retardation layer of $A_C$-type, and the solution enriched with a compound of the second type forms a solid retardation layer of $B_A$-type. The NZ-factor of said solid retardation layer being varied in a wide range, wherein the lower limit is defined by the NZ-factor of the solid retardation layer formed by a compound of the second type.

On one hand the principal refractive indices $n_{xi}$ correspond to the coating direction, and on the other hand the principal refractive indices $n_{yi}$, and $n_{zi}$ correspond to the orthogonal directions, which are in a plane perpendicular to the coating direction. The principal refractive indices $n_{x1}$ and $n\perp_1$ are controlled by a choice of the organic compounds of the first type, and the principal refractive indices $n_{x2}$, $n_{y2}$, and $n_{z2}$ are controlled by a choice of the organic compounds of the second type. Thus, a choice of the organic compounds of the first and second types shown in Tables 2, 3 and 4, and the molar ratio c allows preparing the optical film with a preset relation of the principal refractive indices $n_x$, $n_y$ and $n_z$.

The composition and method disclosed in the present invention allow independently controlling three principal refractive indices of the optical film. The principal refractive indices of the optical film satisfy the following conditions:

$$\begin{cases} n_x = \sum_{i=1}^{N} n_{xi} \cdot c_i \\ n_y = \sum_{i=1}^{N} n_{yi} \cdot c_i \\ n_z = \sum_{i=1}^{N} n_{zi} \cdot c_i \end{cases} \quad (VII)$$

where N is number of components, $n_{xi}$, $n_{yi}$ and $n_{zi}$ are the principal refractive indices corresponding to i-component, and $c_i$ is a molar portion of i-component in a mixture, and wherein $$\sum_{i=1}^{N} c_i = 1.$$

Some particular cases are considered below.

A. A binary composition of one compound of the first type and one compound of the second type, where the following condition is: $n_{y1}=n_{z1}=n\perp_1 < n_{x1}$ and $n_{y2}=n_{z2}=n\perp_2 > n_{x2}$.

The second compound forms negative A-type, but its slow indices are not equal to the slow indices of the positive A-type which is formed from the first compound. Then the relations (VII) will read $$\begin{cases} n_x = c \cdot n_{x1} + (1-c) \cdot n_{x2} \\ n_y = n_z = c \cdot n\perp_1 + (1-c) \cdot n\perp_2 \end{cases}$$

where N=2, $c_1=c$, $c_2=1-c$ and c is a molar portion of the component of the first type.

When the molar ratio c is changed from 0 to 1, the type of the anisotropic optical film transforms from a negative A-type to a positive A-type.

B. A binary composition of one compound of the first type and one compound of the second type.

In this case the refractive indexes of the optical film satisfy the following conditions:

$$\begin{cases} nx = c \cdot n_{x1} + (1-c) \cdot n_{x2}, \\ ny = c \cdot n\perp + (1-c) \cdot n_{y2}, \\ nz = c \cdot n\perp + (1-c) \cdot n_{z2} \end{cases} \quad (VIII)$$

where N=2, $c_1=c$, $c_2=1-c$, and c is a molar ratio having values from 0 to 1.

Based on the relations (VI) and (VIII), $n_y > n_z$ at any value of the molar portion of the compound of the first type C satisfying the following condition: $0 \leq c < 1$. If $n_{x1} > \max(n\perp, n_{y2})$ and $n_{x2} < \min(n\perp, n_{z2})$, then type of the anisotropic optical film changes from a positive $B_A$-type ($n_x < n_z < n_y$) to a positive $A_C$-type ($n_z < n_y < n_x$), when the molar ratio c changes within the specified range, whereas the lower limit of the NZ-factor of anisotropic optical film produced from said composition is defined by the value of NZ-factor of anisotropic optical film formed by an individual compound of the second type.

C. A triple composition comprising one compound of the first type ("+A component") and two compounds of the second type ("$B_A$ component" and "−A component").

This composition may be used when the presence of a polymeric ("+A component") component is required to impart certain desirable properties to lyotropic liquid crystal phase or solid retardation film, however increasing of NZ-factor of retardation film is not desirable. In this case the tolerance range of NZ-factor is from 0 to +∞.

Figure 18:
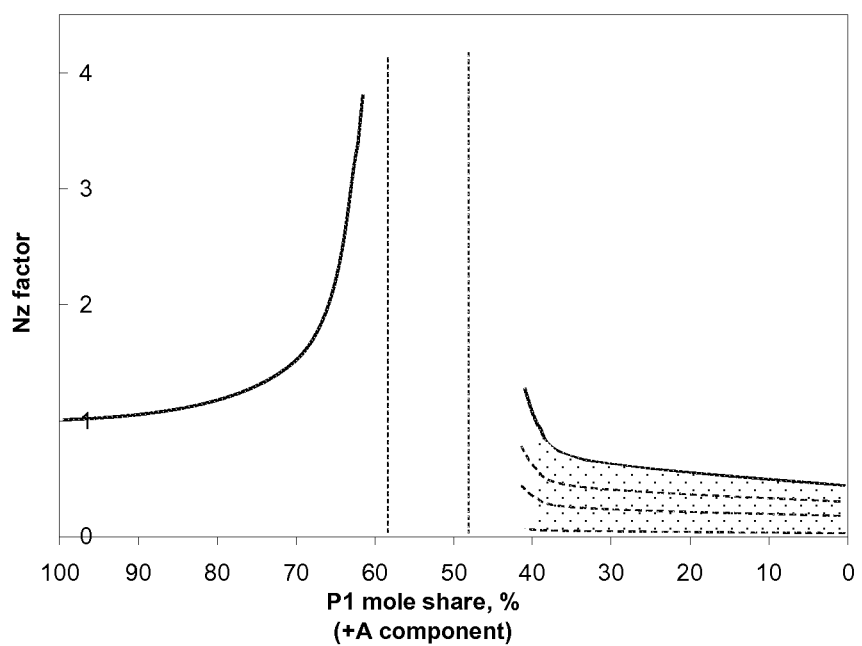
FIG. 18 shows the achievable values of NZ-factor of retardation layer vs. ratio of the first and second type components in a composition.

FIG. 18 summarizes the experimental data based on compositions of P1 and C1 compounds and represents a plot of the NZ-factor of the solid optical retardation layer vs. the molar portion of the component of the second type in the composition and shows achievable range of values of the NZ-factor vs. composition.

Example 20

This Example describes preparation of a solid optical retardation layer of the $A_C$-type from a solution comprising a binary composition of poly(2,2'-disulfo-4,4'-benzidine sulfoterephthalamide) (structure 4 in Table 2) cesium salt referenced hereafter as P2, and the compound C1 described in Example 17. Said composition of organic compounds is capable of forming a joint lyotropic liquid crystal system. The rigid rod-like macromolecules of P2 are capable of aligning together with π-π stacks (columns) of board-like supramolecules C1.

The P2/C1=65/35 mol % composition was prepared as follows: 5.32 g (0.0065 mol) of cesium salt of P2 was dissolved in 475 g of de-ionized water (conductivity ~5 μSm/cm); the suspension was mixed with a magnet stirrer. After dissolving, the solution was filtered with the hydrophilic nylon filter with pore size 45 μm. Separately, 1.86 g (0.0035 mol) of C1 was dissolved in 60 g of de-ionized water; the suspension was mixed with a magnet stirrer. While stirring, 4.4 ml of 20 wt. % Cesium hydroxide (0.007 mol) was gradually added drop-by-drop into suspension for approximately 15 minutes until a clear solution was formed. Clear solutions of P2 and C1 were mixed together to form 547 g of a clear solution. This composition was concentrated on a rotary evaporator in order to remove an excess of water and formed 127 g of a binary composition representing a lyotropic liquid crystal (LLC) solution. The total concentration of the composition (P2+C1) $C_{TOT}$ was equal to about 6 wt. %.

The coatings were produced and optically characterized as described in the Example 14. The value of NZ-factor of the coatings is equal to about 2.0.

Example 21

This Example describes the preparation of a solid optical retardation layer of $B_A$-type from a solution comprising a binary composition of the organic compounds P2 described in Example 20 and C1 described in Example 17.

The P2/C1=35/65 molar % composition was prepared as follows: 2.86 g (0.0035 mol) of the cesium salt of P2 was dissolved in 70 g of de-ionized water (conductivity ~5 μm/cm); the suspension was mixed with a magnet stirrer. After dissolving, the solution was filtered at the hydrophilic nylon filter with pore size 45 μm. Separately, 3.44 g (0.0065 mol) of C1 was dissolved in 103 g of de-ionized water; suspension was mixed with a magnet stirrer. While stirring, 7.75 ml of 20 wt. % Cesium hydroxide was gradually added drop-by-drop into the suspension for approximately 15 minutes until a clear solution was formed. Clear solutions of P2 and C1 were mixed together to form 400 g of a clear solution. This composition was concentrated on a rotary evaporator in order to remove an excess of water and form 70 g of a binary composition representing a lyotropic liquid crystal (LLC) solution. The total concentration of composition (P2+C1) $C_{TOT}$ was equal to about 11%.

The coatings were produced and optically characterized, as was described in Example 14, however, Gardner® wired stainless steel rod #4 was used instead of Gardner® wired stainless steel rod #8. The obtained solid optical retardation layer was characterized by principle refractive indices, which obey the following condition: $n_x<n_z<n_y$. The NZ-factor at the wavelength λ=550 nm is equal to about 0.7.

Example 22

This Example describes preparation of a solid optical retardation layer of the $A_C$-type from a solution comprising a binary composition of poly(2,2'-disulfo-4,4'-benzidine naphthalene-2,6-dicarboxamide) (structure 7 in Table 2) referenced hereafter as P3, and C1 described in Example 17. Said composition of organic compounds is capable of forming a joint lyotropic liquid crystal system. The rigid rod-like macromolecules of P3 are capable of aligning together with π-π (stacks (columns) of board-like supramolecules C1.

The P3/C1=65/35 mol % composition was prepared as follows: 5.12 g (0.0065 mol) of cesium salt of P3 was dissolved in 475 g of de-ionized water (conductivity ~5 μSm/cm); the suspension was mixed with a magnet stirrer. After dissolution, the solution was filtered with the hydrophilic nylon filter with pore size 45 μm. Separately, 1.86 g (0.0035 mol) of C1 was dissolved in 60 g of de-ionized water; the suspension was mixed with a magnet stirrer. While stirring, 4.4 ml of 20 wt. % Cesium hydroxide (0.007 mol) was gradually added drop-by-drop into suspension for approximately 15 minutes until a clear solution was formed. Clear solutions of P3 and C1 were mixed together to form 547 g of a clear solution. This composition was concentrated on a rotary evaporator in order to remove an excess of water and form 127 g of a binary composition representing a lyotropic liquid crystal (LLC) solution. The total concentration of the composition (P3+C1) $C_{TOT}$ was equal to about 6 wt. %.

The coatings were produced and optically characterized as described in the Example 14. The value of NZ-factor of the coatings is equal to about 2.4.

Example 23

This Example describes the preparation of a solid optical retardation layer of $B_A$-type from a solution comprising a binary composition of the same organic compounds P3 and C1 described in Example 17.

P3/C1=30/70 molar % composition was prepared as follows: 2.36 g (0.0030 mol) of the cesium salt of P3 was dissolved in 70 g of de-ionized water (conductivity ~5 μSm/cm); the suspension was mixed with a magnet stirrer. After dissolving, the solution was filtered at the hydrophilic nylon filter with pore size 45 μm. Separately, 3.70 g (0.0070 mol) of C1 was dissolved in 103 g of deionized water; suspension was mixed with a magnet stirrer. While stirring, 7.75 ml of 20 wt. % Cesium hydroxide was gradually added drop-by-drop into the suspension for approximately 15 minutes until a clear solution was formed. Clear solutions of P3 and C1 were mixed together to form 400 g of a clear solution. This composition was concentrated on a rotary evaporator in order to remove an excess of water and form 70 g of a binary composition representing a lyotropic liquid crystal (LLC) solution. The total concentration of composition (P3+C1) $C_{TOT}$ was equal to about 11%.

The coatings were produced and optically characterized as described in Example 14, however, Gardner® wired stainless steel rod #4 was used instead of Gardner® wired stainless steel rod #8. The obtained solid optical retardation layer is characterized by the thickness equal to approximately 350 nm and the principle refractive indices, which obey the following condition: $n_x<n_z<n_y$. The NZ-factor at the wavelength λ=550 nm is equal to about 0.6.

The above described examples show the ability to tailor the degree of biaxiality of the solid optical retardation layer by varying ratio of the organic compounds of the first and the second type in the composition.

Example 24

Figure 19:
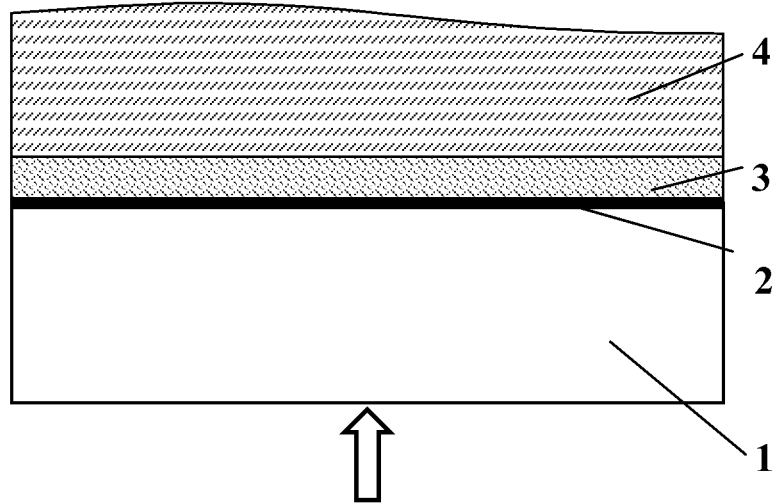
FIG. 19 schematically shows the cross section of an optical film formed on a substrate, further comprising adhesive and protective layers.

FIG. 19 shows the cross section of an optical film formed on substrate 1. The film contains solid optical retardation layer 2, adhesive layer 3, and protective layer 4. The solid optical retardation layer can be manufactured using methods described in Examples 14 or 16. The polymer layer 4 protects the optical crystal film from damage in the course of its transportation.

This optical film is a semiproduct, which may be used in LCDs as for example an external retarder. Upon removal of the protective layer 4, the optical film can be applied onto a glass with adhesive layer 3.

Example 25

Figure 20:
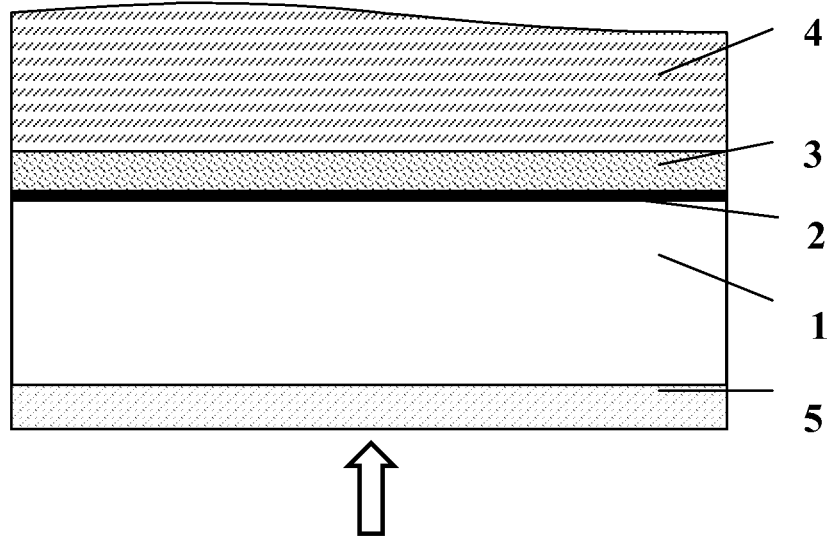
FIG. 20 schematically shows the cross section of an optical film with an additional antireflective layer.

The above described optical film with an additional antireflection layer 5 formed on the substrate can be applied to the LCD front surface (FIG. 20). For example, an antireflection layer of silicon dioxide reduces by 30% the fraction of light reflected from the LCD front surface.

Example 26

Figure 21:
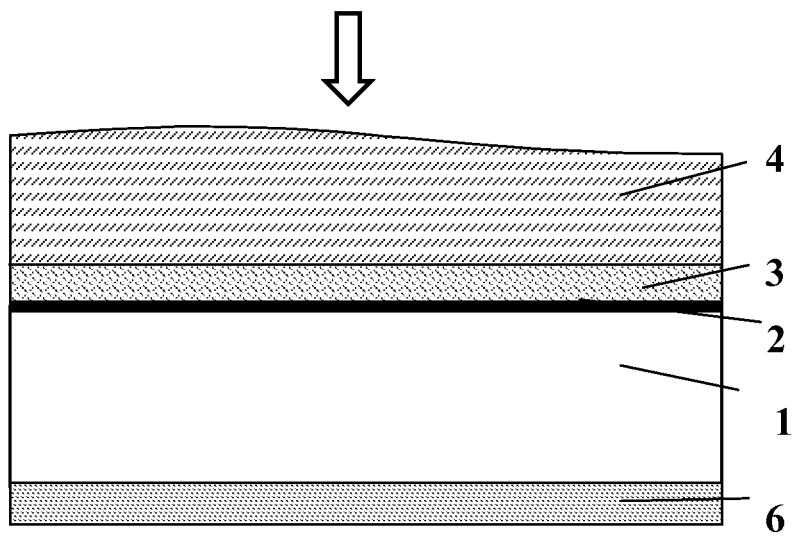
FIG. 21 schematically shows the cross section of an optical film with an additional reflective layer.

With the above described optical film applied to the front surface of an electrooptical device or an LCD, an additional reflective layer 6 can be formed on the substrate (FIG. 21). The reflective layer may be obtained, for example, by depositing an aluminium film.

Example 27

Figure 22:
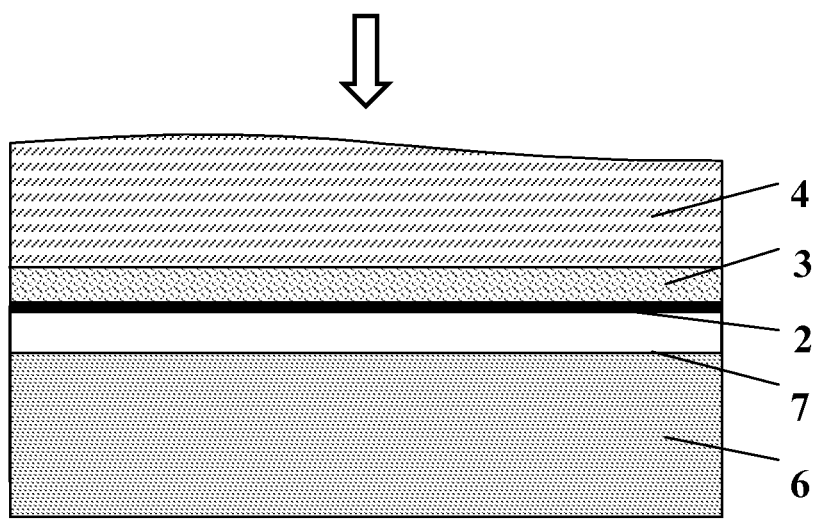
FIG. 22 schematically shows the cross section of an optical film with a diffuse or specular reflector as a substrate.

In this Example, the solid optical retardation layer 2 is applied onto the diffuse or specular semitransparent reflector 6 that serves as a substrate (FIG. 22). The reflector layer 6 may be covered with the planarization layer 7 (optional). Polyurethane or an acrylic polymer or any other material can be used for making this planarization layer.

Example 28

This example describes a multidomain vertical alignment liquid crystal display (MVA LCD) compensated with a single biaxial $A_C$-type plate according to the present invention. The optical layers of the simulated MVA LCD design are shown in FIG. 23 and comprise two polarizers, 8 and 11, arranged on each side of the liquid crystal cell 10, and one compensating structure 9 located between the front polarizer 8 and the liquid crystal cell 10.

The LCD further comprises a backlight 12. The compensating structure comprises a single retardation layer characterized by two in-plane refractive indices (nf and ns) corresponding to a fast principal axis and a slow principal axis respectively, and one refractive index (nn) in the normal direction which obey the following conditions for electromagnetic radiation in the visible spectral range: ns>nf>nn. This retardation layer is biaxial $A_C$-type plate having the following parameters: thickness d=1.2 microns and $n_s$=1.72, $n_f$=1.68, $n_n$=1.62 ($n_s$>$n_f$>$n_n$) at wavelength λ=550 nm. The preparation of this type retardation layer is described in Examples 17, 20 and 22, wherein $n_x$=$n_s$, $n_y$=$n_f$, and $n_z$=$n_n$.

The front 8 and rear 11 polarizers each comprise one inner TAC layer with typical properties of negative C-type plate providing a retardation of 50 nm. This TAC film retardation influences the optical compensation and is taken into account. The setup is based on a multidomain vertical alignment liquid crystal (MVA LC) cell wherein four LC domains with reorientation planes at azimuth angles 45, 135, −45, −135 are used. The thickness d of the VA cell was chosen on account of the LC optical anisotropy Δn in order to provide a cell retardation of Δnd≈275 nm. The LC director pretilt angle with respect to the layer surface is 89°. The LC material with negative dielectric anisotropy ($\epsilon_\parallel$-$\epsilon_\perp$=−3.5) and low birefringence (Δn≈0.08) is aligned at azimuth angles: 45, 135; −45, −135. The elastic modules of the LC used in simulations were of typical values: $K_{11}$=10 pN, $K_{22}$=5 pN and $K_{33}$=15 pN. For the given LC parameters the state with transmission close to the maximal value is achieved at an applied voltage of 8 V that agrees with the experiment.

Figure 23:
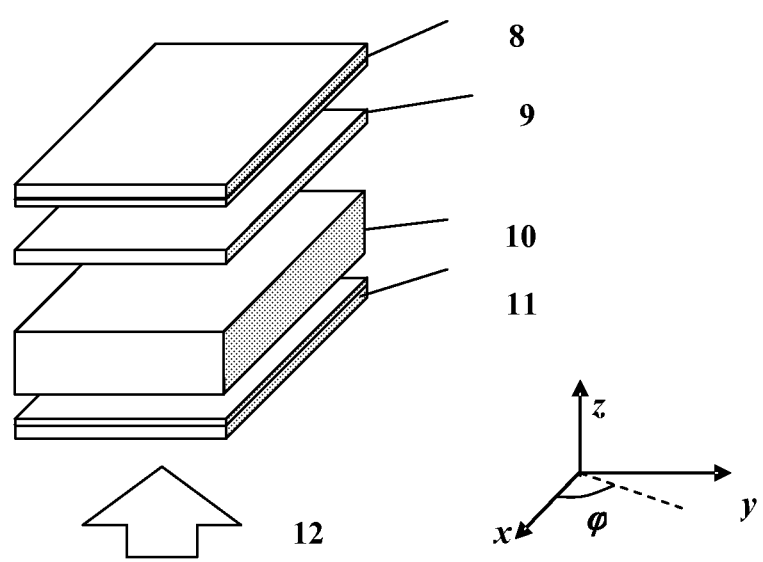
FIG. 23 schematically shows the general scheme of VA LCD compensated with biaxial $A_C$-type plate retarder.

The angular orientation of principal axes of the optically anisotropic elements shown in FIG. 23 is as follows:
transmission axes of the front and rear polarizers are at φ=90° and φ=0° respectively,
the $n_s$ direction is at φ=90° in case of biaxial $A_C$-type plate retarder.

Figure 24A:
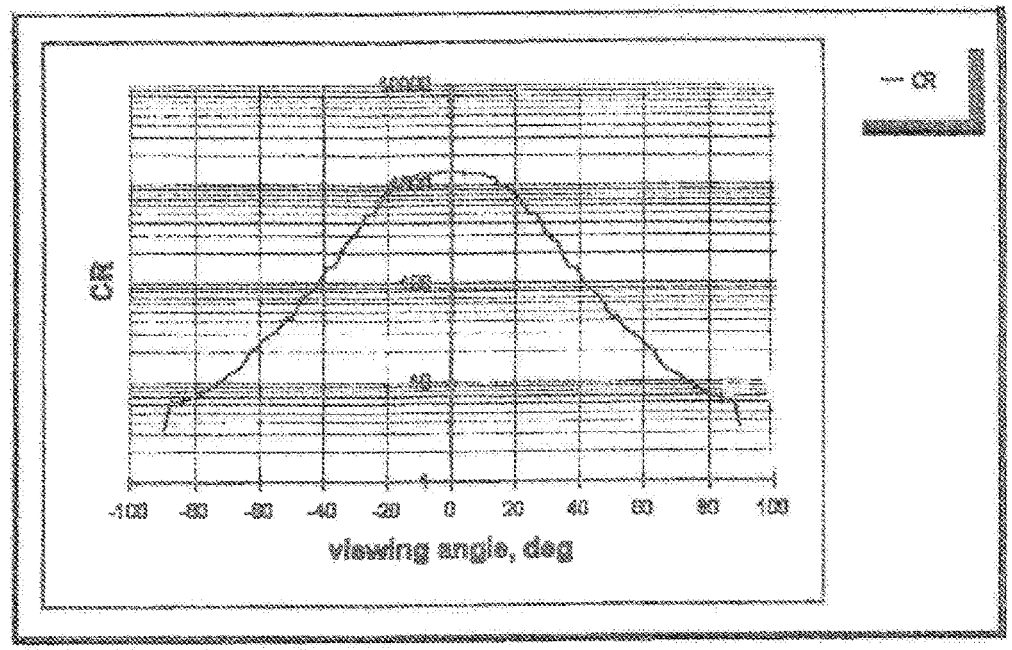
FIGS. 24a and 24b show the simulated viewing angle contrast ratio map at wavelength λ=550 nm of VA LCD compensated with biaxial $A_C$-type plate retarder.
Figure 24B:
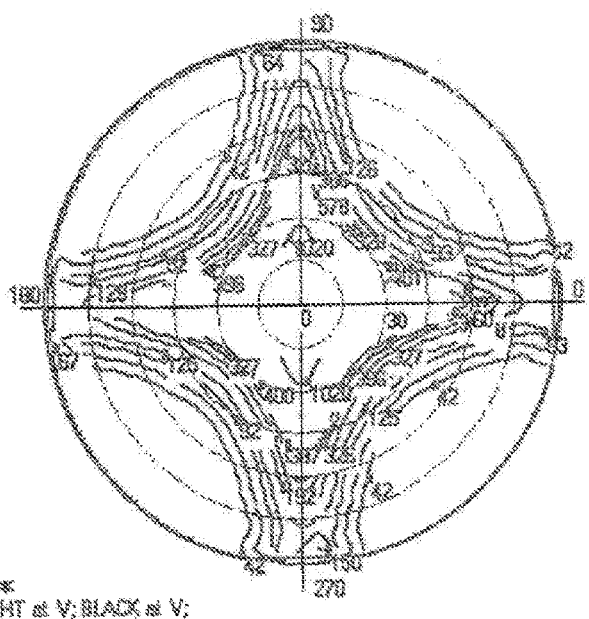
Figure 25A:
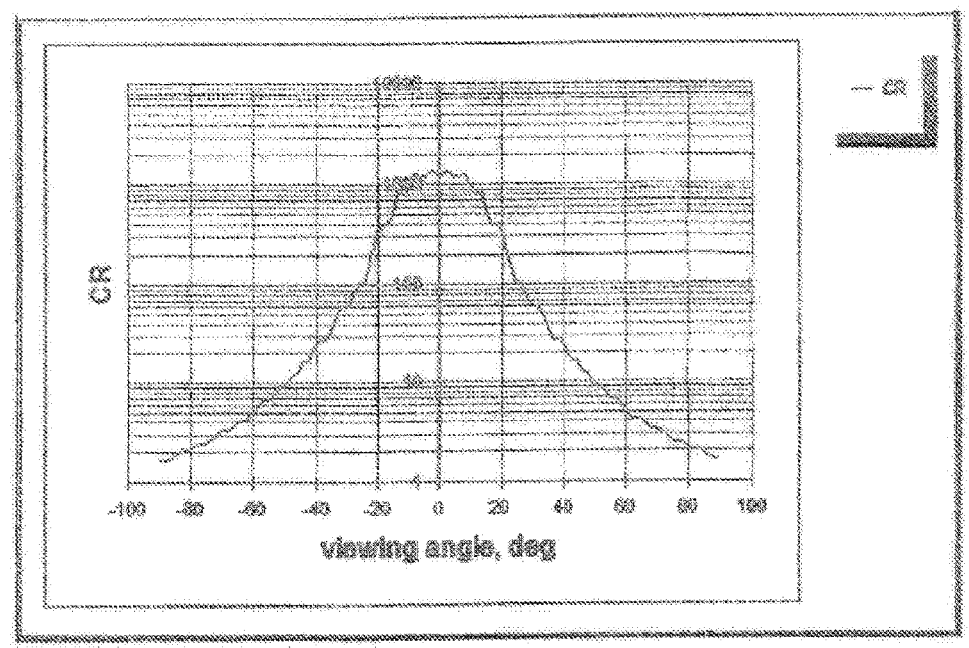
FIGS. 25a and 25b show the simulated viewing angle contrast ratio map at wavelength λ=550 nm of the non-compensated multidomain vertical alignment liquid crystal display (MVA LCD).
Figure 25B:
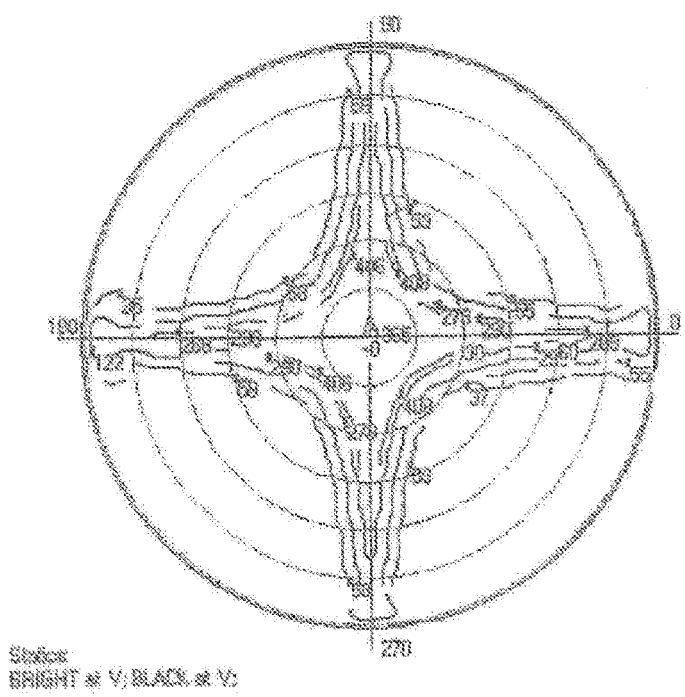

Optimization of an $A_C$-type plate thickness was performed for maximal contrast ratio at 550 nm. The contrast ratio vs. viewing angle is shown in FIGS. 24a and 24b. For comparison the contrast ratio vs. viewing angle of the non-compensated multidomain vertical alignment liquid crystal display (MVA LCD) is shown in FIGS. 25a and 25b.

Example 29

Figure 26:
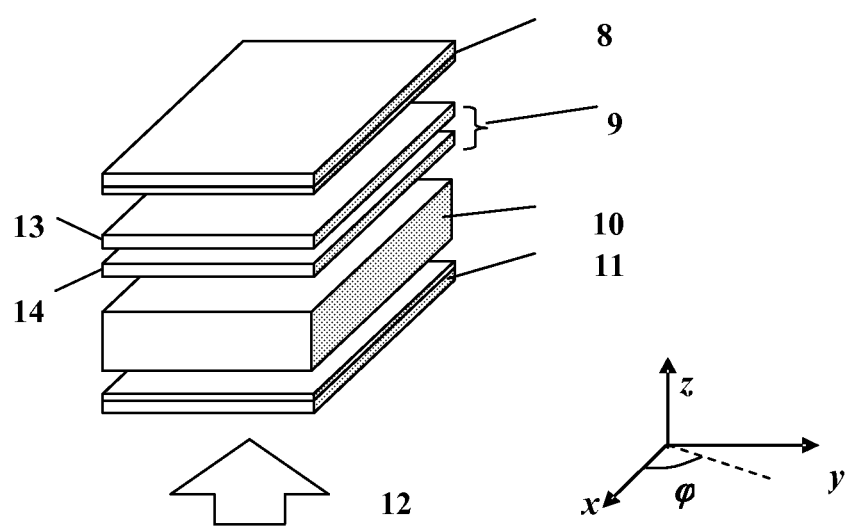
FIG. 26 shows the optical layers of the simulated multidomain vertical alignment liquid crystal display (MVA LCD) compensated with a biaxial AC-type plate and uniaxial negative C-plate according to the present invention.

This Example describes the multidomain vertical alignment liquid crystal display (MVA LCD) compensated with a biaxial $A_C$-type plate and uniaxial negative C-plate according to the present invention. The optical layers of the simulated MVA LCD design are shown in FIG. 26 and comprise two polarizers, 8 and 11, arranged on each side of the liquid crystal cell 10, and one compensating structure 9 located between the front polarizer 8 and the liquid crystal cell 10. The LCD comprises a backlight 12 also. The compensating structure comprises a biaxial $A_C$-type plate 14 and uniaxial negative C-plate 13, which has an optical axis perpendicular to the plate. The biaxial $A_C$-type plate has the following parameters: thickness d=1.2 microns and $n_s$=1.72, $n_f$=1.68, $n_n$=1.62 ($n_s$>$n_f$>$n_n$) at wavelength λ=550 nm. The preparation of this type retardation layer is described in Examples 17, 20 and 22, wherein $n_x$=$n_s$, $n_y$=$n_f$, and $n_z$=$n_n$. The uniaxial negative C-plate is characterized by retardation which is equal to 70 nm.

The front 8 and rear 11 polarizers each comprise TAC layers with typical properties of negative C-type plate providing a retardation of 50 nm. This TAC film retardation influences the optical compensation and is taken into account. The setup is based on a multidomain vertical alignment liquid crystal (MVA LC) cell wherein four LC domains with reorientation planes at azimuth angles 45, 135, −45, −135 are used. The thickness d of the VA cell was chosen on account of the LC optical anisotropy Δn in order to provide a cell retardation of Δnd≈275 nm. The LC director pretilt angle with respect to the layer surface was 89°. The LC material with negative dielectric anisotropy ($\epsilon_\parallel$-$\epsilon_\perp$=−3.5) and low birefringence (λn≈0.08) is aligned at azimuth angles: 45, 135; −45, −135. The elastic modules of the LC used in simulations were of typical values: $K_{11}$=10 pN, $K_{22}$=5 pN and $K_{33}$=15 pN. The state with transmission close to the maximal value with such LC parameters is achieved at an applied voltage of 8 V that agrees with the experiment.

The angular orientation of principal axes of the optically anisotropic elements shown in FIG. 26 is as follows:
transmission axes of the front and rear polarizers are at φ=90° and φ=0° respectively,
the $n_s$ direction is at φ=90° in case of biaxial $A_C$-type plate retarder.

Figure 27A:
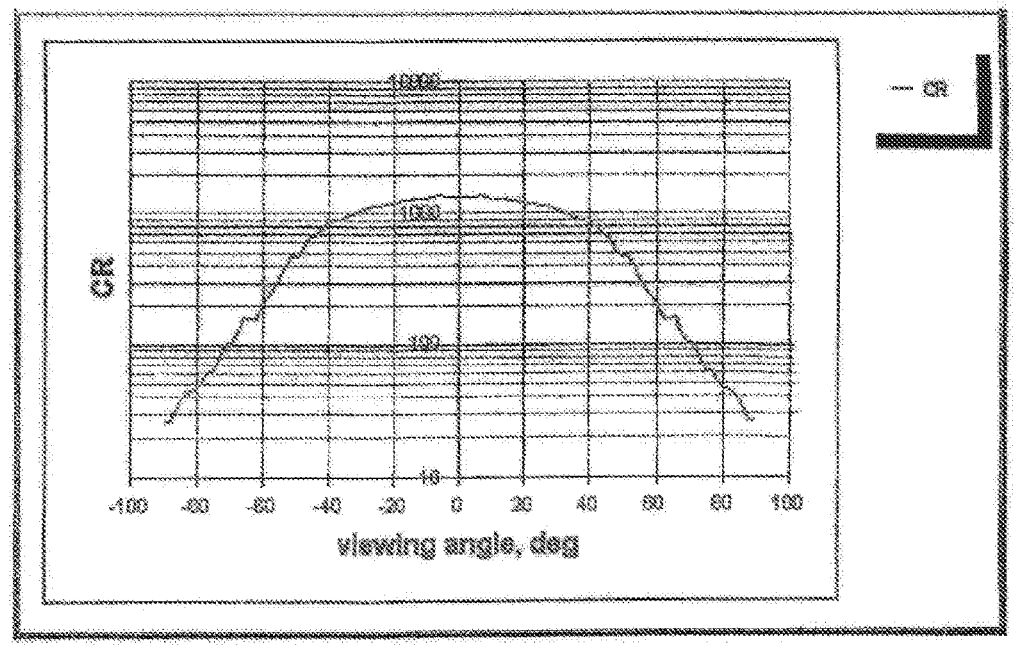
FIGS. 27a and 27b show the contrast ratio vs. viewing angle of optimal double-plate compensated MVA LCD.
Figure 27B:
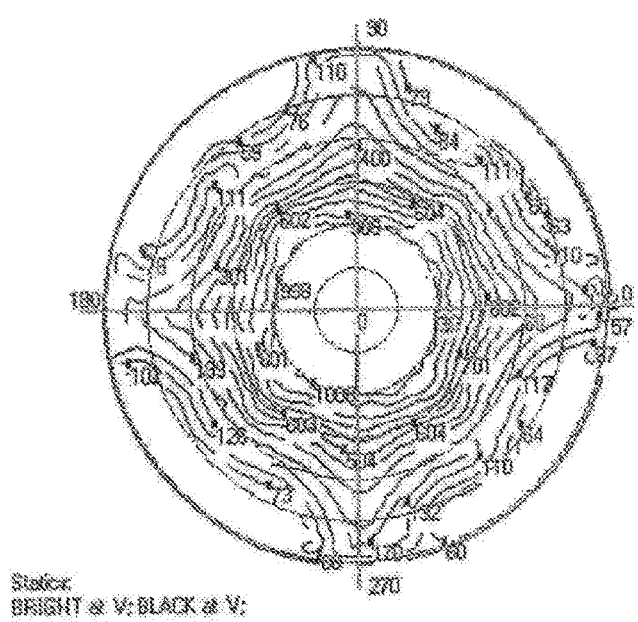
Figure 28:
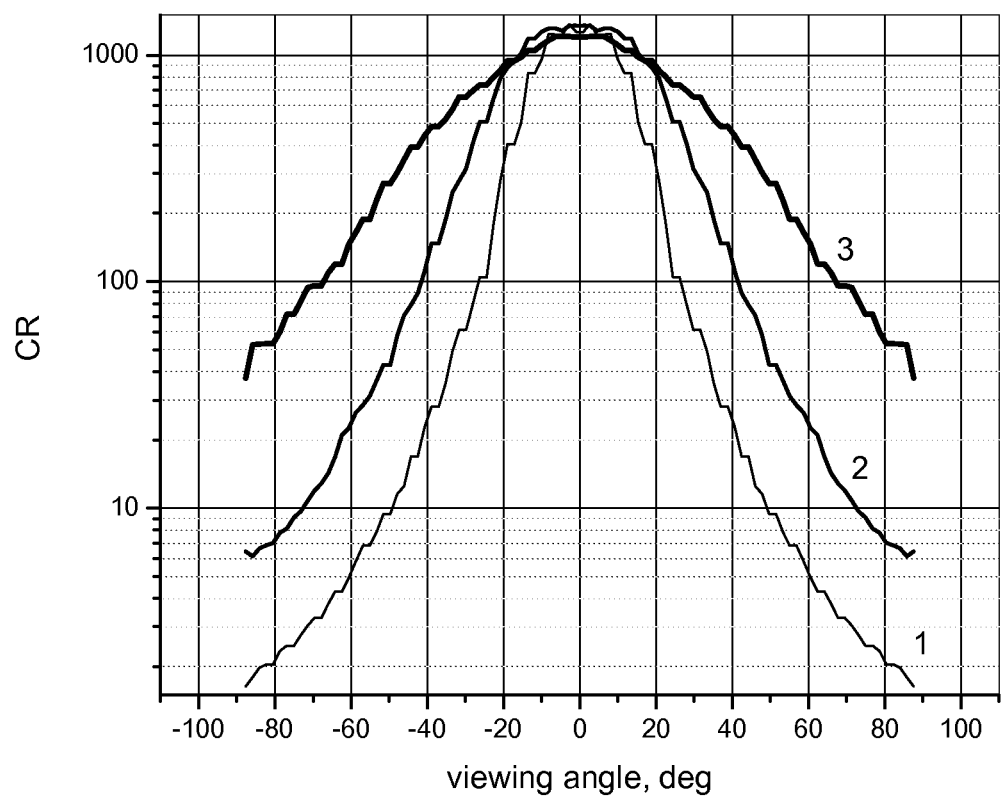
FIG. 28 shows the contrast ratios vs. viewing angle for no compensation (curve 1), single plate compensation (curve 2), and double plate compensation (curve 3) of multidomain vertical alignment liquid crystal display (MVA LCD).

The contrast ratio vs. viewing angle of optimal double-plate compensated MVA LCD is shown in FIGS. 27a and 27b. For comparison the contrast ratios vs. viewing angle for no compensation (curve 1), single plate compensation (curve 2), and double plate compensation (curve 3) of multidomain vertical alignment liquid crystal display (MVA LCD) are shown in FIG. 28.

Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:
1. A composition comprising:
at least one organic compound of a first type, and
at least one organic compound of a second type,
wherein the organic compound of the first type has the general structural formula I

(I)

where Core is a conjugated organic unit capable of forming a rigid rod-like macromolecule,
n is a number of the conjugated organic units in the rigid rod-like macromolecule,
$G_k$ is a set of ionogenic side-groups, and
k is a number of the side-groups in the set $G_k$;
wherein the ionogenic side-groups and the number k provide solubility of the organic compound of the first type in a solvent and give rigidity to the rod-like macromolecule; the number n provides molecule anisotropy that promotes self-assembling of macromolecules in a solution of the organic compound or its salt,
wherein the number k is equal to 0, 1, 2, 3, 4, 5, 6, 7, or 8, and the number n is an integer in the range from 10 to 10000;
wherein the rod-like macromolecule has a polymeric main rigid-chain, wherein at least one rigid-core polymer is a copolymer having the general structural formula IV

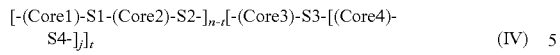 (IV)

wherein Core1, Core2, Core3 and Core4 are conjugated organic components, spacers S1, S2, S3 and S4 are selected independently from the group consisting of —CO—NH—, —NH—CO—, —O—NH—, linear and branched ($C_1$-$C_4$)alkylenes, linear and branched ($C_1$-$C_4$)alkenylenes, ($C_2$-$C_{20}$)polyethylene glycols, —O—$CH_2$—, —$CH_2$—O—, —CH=CH—, —CH=CH—COO—, —OOC—CH=CH—, —CO—$CH_2$—, —OCO—O—, —OCO—, —C≡C—, —CO—S—, —S—, —S—CO—, —O—, —NH—, —N($CH_3$)—, n is an integer in the range from 10 to 10000, t is an integer in the range from 1 to n-1 and j is 0 or 1, and wherein the conjugated organic component Core3 differs from Core1 or Core 2, or Core4 differs from Core1 or Core2;

wherein the conjugated organic components Core1, Core2, Core3 and Core4 comprising ionogenic groups G are selected from the structures based on benzene ring and naphthalene and having general formula 1 to 2:

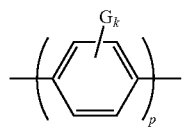 (1)

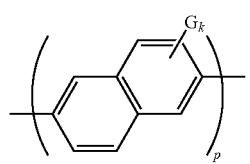 (2)

wherein the ionogenic side-groups G are selected from the group consisting of —COOH, —$SO_3H$, and —$H_2PO_3$, k is equal 0, 1 or 2, p is equal to 1, 2 or 3; and wherein the organic compound of the second type has the general structural formula II

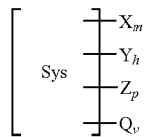 (II)

where Sys is an at least partially conjugated substantially planar cyclic or polycyclic molecular system;
X, Y, Z, and Q are substituents;
substituent X is a carboxylic group —COOH, m is 0, 1, 2, 3 or 4;
substituent Y is a sulfonic group —$SO_3H$, h is 0, 1, 2, 3 or 4;
substituent Z is a carboxamide —$CONH_2$, p is 0, 1, 2, 3 or 4;
substituent Q is a sulfonamide —$SO_2NH_2$, v is 0, 1, 2, 3 or 4;

wherein the organic compound of the second type is capable of forming board-like supramolecules via π-π-interaction, and wherein the composition is capable of forming a lyotropic liquid crystal solution, and said solution is capable of forming a solid retardation layer substantially transparent to electromagnetic radiation in the visible spectral range;

wherein Sys is selected from the structures with general formula 14 to 20:

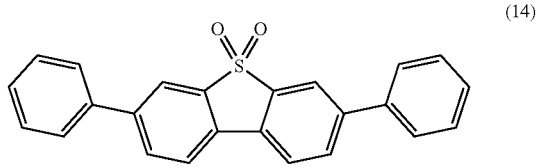 (14)

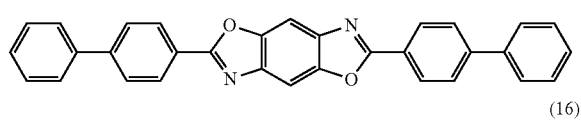 (15)

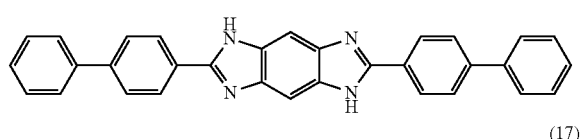 (16)

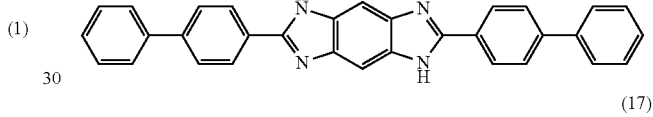 (17)

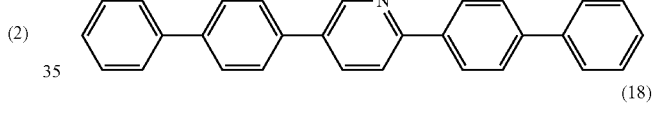 (18)

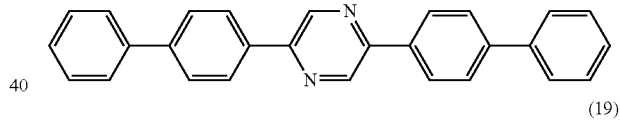 (19)

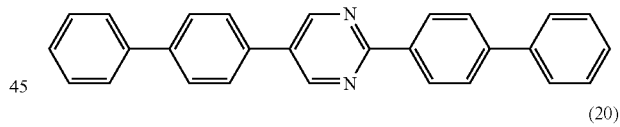 (20)

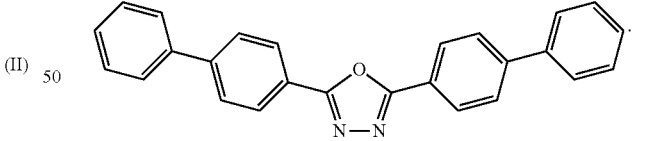

2. A composition according to claim 1, wherein the type and degree of biaxiality of the solid retardation layer is controlled by a molar ratio of the organic compounds of the first and the second type in the composition.

3. A composition according to claim 1, wherein the rigid rod-like macromolecule has a copolymeric main rigid-chain, and wherein at least one conjugated organic unit is different from others.

4. A composition according to claim 1, wherein the organic compound of the first type is selected from structures 3 to 13, wherein the ionogenic side-group G is a sulfonic group —$SO_3H$, and k is equal to 0, 1 or 2:

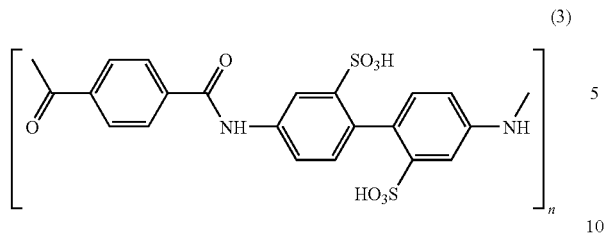

poly(2,2'-disulfo-4,4'-benzidine terephthalamide) (3)

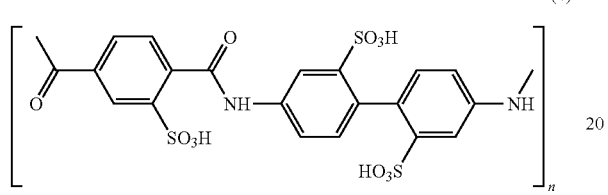

poly(2,2'-disulfo-4,4'-benzidine sulfoterephthalamide) (4)

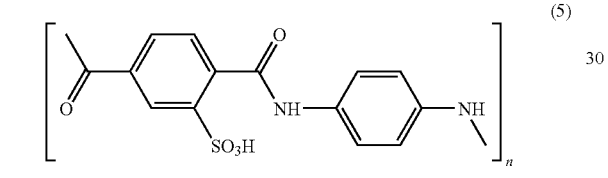

poly(para-phenylene sulfoterephthalamide) (5)

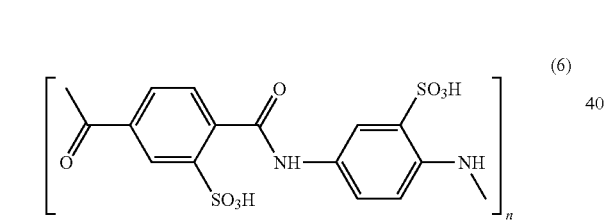

poly(2-sulfo-1,4-phenylene sulfoterephthalamide) (6)

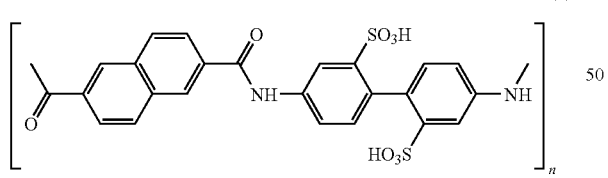

poly(2,2'-disulfo-4,4'-benzidine naphthalene-2,6-dicarboxamide) (7)

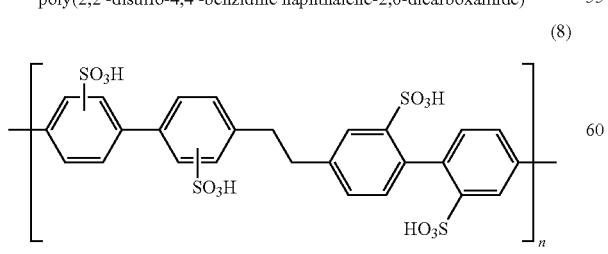

Poly(disulfobiphenylene-1,2-ethylene-2,2'disulfobiphenylene) (8)

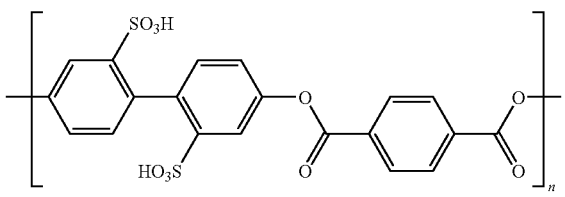

Poly(2,2'-disulfobiphenyl-dioxyterephthaloyl) (9)

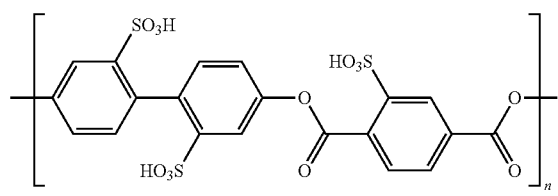

Poly(2,2'-disulfobiphenyl-2-sulfodioxyterephthaloyl) (10)

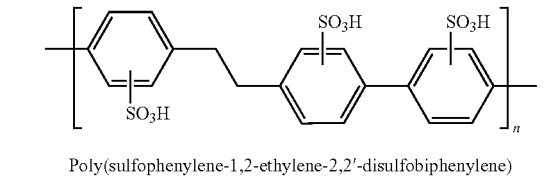

Poly(sulfophenylene-1,2-ethylene-2,2'-disulfobiphenylene) (11)

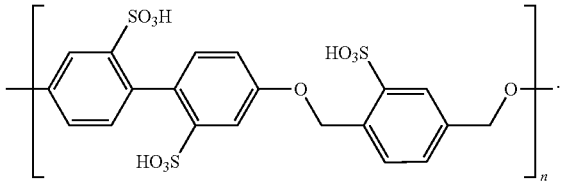

Poly(2-sulfophenylene-1,2-ethylene-2'-sulfophenylene) (12)

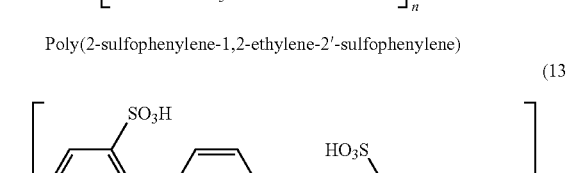

Poly(2,2'-disulfobiphenyl-2-sulfo-1,4-dioxymethylphenylene) (13)

5. A composition according to claim 1, wherein the organic compound of the first type further comprises additional side-groups independently selected from the group consisting of linear and branched ($C_1$-$C_{20}$)alkyl, ($C_2$-$C_{20}$)alkenyl, and ($C_2$-$C_{20}$)alkinyl.

6. A composition according to claim 5, wherein at least one of the additional side-groups is connected with the Core via a bridging group A selected from the group consisting of —C(O)—, —C(O)O—, —C(O)—NH—, —(SO$_2$)NH—, —O—, —CH$_2$O—, —NH—, >N—, and any combination thereof

7. A composition according to claim 1, wherein the salt of the organic compound of the first type is selected from the group consisting of ammonium and alkali-metal salts.

8. A composition according to claim 1, further comprising inorganic compounds which are selected from the group consisting of hydroxides and salts of alkali metals.

9. An optical film comprising:

a substrate having front and rear surfaces, and at least one solid optical retardation layer on the front surface of the substrate, wherein the solid optical retardation layer comprises at least one organic compound of a first type, and at least one organic compound of a second type, wherein the organic compound of the first type has the general structural formula I

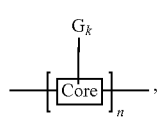

(I)

where Core is a conjugated organic unit capable of forming a rigid rod-like macromolecule, n is a number of the conjugated organic units in the rigid rod-like macromolecule, $G_k$ is a set of ionogenic side-groups, and k is a number of the side-groups in the set $G_k$;

wherein the ionogenic side-groups and the number k provide solubility of the organic compound of the first type in a solvent and give rigidity to the rod-like macromolecule;

the number n provides molecule anisotropy that promotes self-assembling of macromolecules in a solution of the organic compound or its salt, wherein the number k is equal to 0, 1, 2, 3, 4, 5, 6, 7, or 8, and the number n is an integer in the range from 10 to 10000;

wherein the rod-like macromolecule has a polymeric main rigid-chain, wherein at least one rigid-core polymer is a copolymer having the general structural formula IV

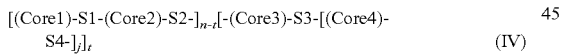

(IV)

wherein Core1, Core2, Core3 and Core4 are conjugated organic components, spacers S1, S2, S3 and S4 are selected independently from the group consisting of —CO—NH—, —NH—CO—, —O—NH—, linear and branched ($C_1$-$C_4$)alkylenes, linear and branched ($C_1$-$C_4$)alkenylenes, ($C_2$-$C_{20}$)polyethylene glycols, —O—$CH_2$—, —$CH_2$—O—, —CH=CH—, —CH=CH—COO—, —OOC—CH=CH—, —CO—$CH_2$—, —OCO—O—, —OCO—, —C≡C—, —CO—S—, —S—, —S—CO—, —O—, —NH—, —N($CH_3$)—, n is an integer in the range from 10 to 10000, t is an integer in the range from 1 to n-1 and j is 0 or 1, and wherein the conjugated organic component Core3 differs from Core1 or Core 2, or Core4 differs from Core1 or Core2;

wherein the conjugated organic components Core1, Core2, Core3 and Core4 comprising ionogenic groups G are selected from the structures based on benzene ring and naphthalene and having general formula 1 to 2:

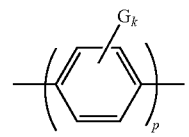

(1)

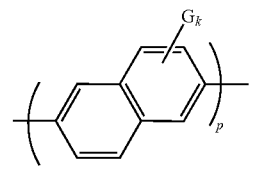

(2)

wherein the ionogenic side-groups G are selected from the group consisting of —COOH, —$SO_3H$, and —$H_2PO_3$, k is equal 0, 1 or 2, p is equal to 1, 2 or 3; and wherein the organic compound of the second type has the general structural formula II

(II)

where Sys is an at least partially conjugated substantially planar cyclic or polycyclic molecular system;

X, Y, Z, and Q are substituents;

substituent X is a carboxylic group —COOH, m is 0, 1, 2, 3 or 4;

substituent Y is a sulfonic group —$SO_3H$, h is 0, 1, 2, 3 or 4;

substituent Z is a carboxamide —$CONH_2$, p is 0, 1, 2, 3 or 4;

substituent Q is a sulfonamide —$SO_2NH_2$, v is 0, 1, 2, 3 or 4;

wherein the organic compound of the second type is capable of forming board-like supramolecules via π-π-interaction, and solid optical retardation layer substantially transparent to electromagnetic radiation in the visible spectral range;

wherein Sys is selected from the structures with general formula 14 to 20:

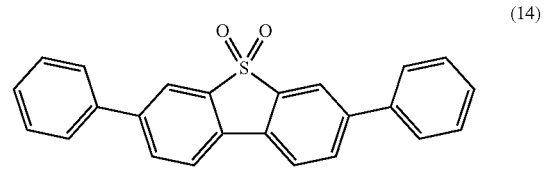

(14)

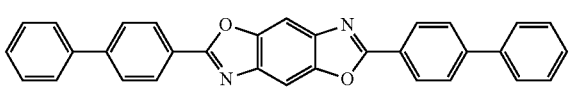

(15)

-continued

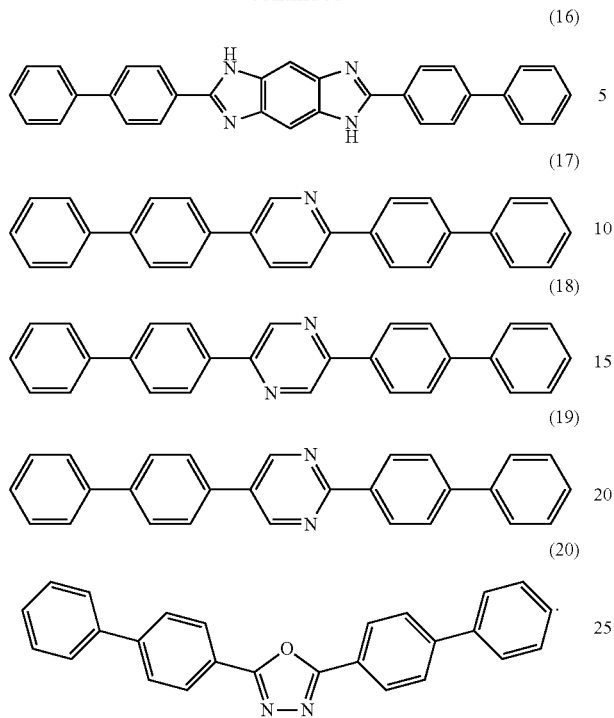

10. An optical film according to claim 9, wherein the type and degree of biaxiality of the said optical retardation layer is controlled by a molar ratio of the organic compounds of the first and the second type in the composition.

11. An optical film according to claim 9, wherein the rod-like macromolecule has a polymeric main rigid-chain, and wherein the conjugated organic units are the same.

12. An optical film according to claim 9, wherein the rigid rod-like macromolecule has a copolymeric main rigid-chain, and wherein at least one conjugated organic unit is different from others.

13. An optical film according to claim 9, wherein the organic compound of the first type is selected from structures 3 to 13, wherein the ionogenic side-group G is sulfonic group —SO₃H, and k is equal to 0, 1 or 2:

(3)

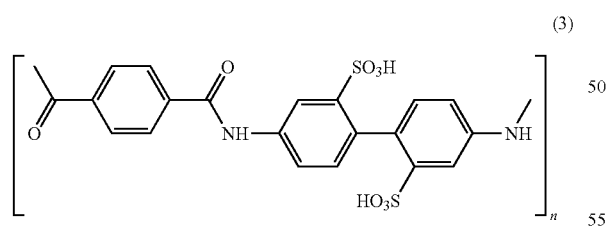

poly(2,2'-disulfo-4,4'-benzidine terephthalamide)

(4)

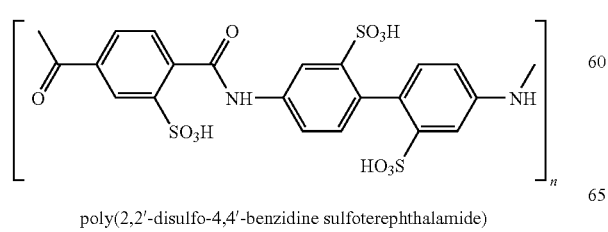

poly(2,2'-disulfo-4,4'-benzidine sulfoterephthalamide)

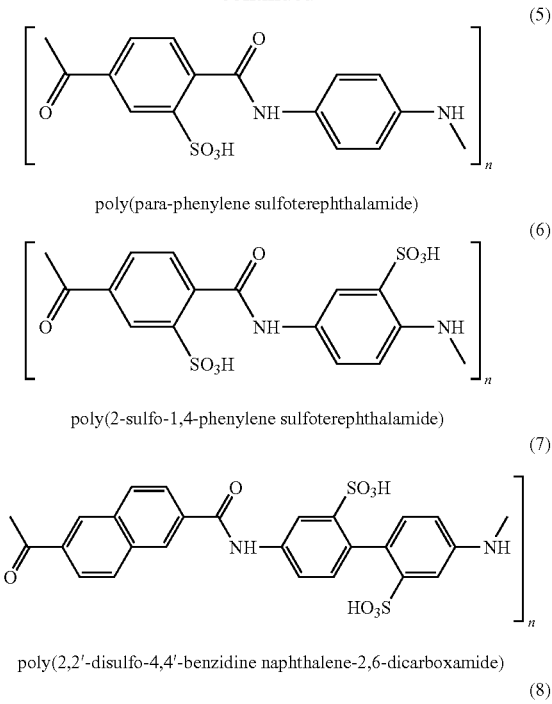

poly(para-phenylene sulfoterephthalamide)

poly(2-sulfo-1,4-phenylene sulfoterephthalamide)

poly(2,2'-disulfo-4,4'-benzidine naphthalene-2,6-dicarboxamide)

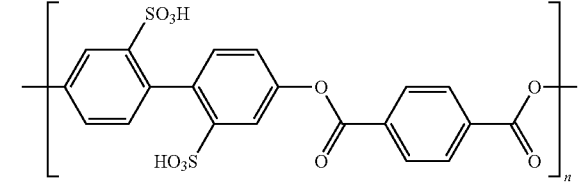

Poly(disulfobiphenylene-1,2-ethylene-2,2'disulfobiphenylene)

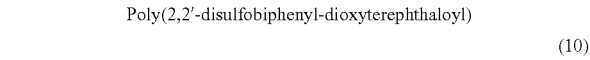

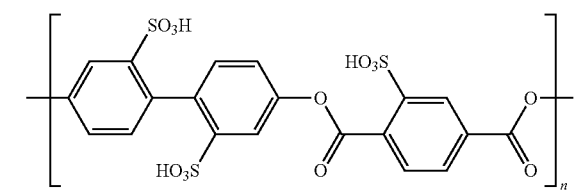

Poly(2,2'-disulfobiphenyl-dioxyterephthaloyl)

Poly(2,2'-disulfobiphenyl-2-sulfodioxyterephthaloyl)

Poly(sulfophenylene-1,2-ethylene-2,2'-disulfobiphenylene)

(12)

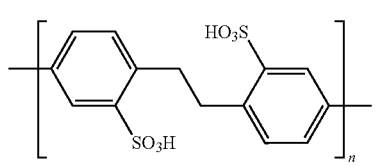

Poly(2-sulfophenylene-1,2-ethylene-2'-sulfophenylene)

(13)

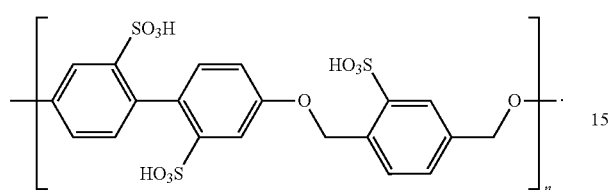

Poly(2,2'-disulfobiphenyl-2-sulfo-1,4-dioxymethylphenylene)

14. An optical film according to claim 9, wherein the organic compound of the first type further comprises additional side-groups independently selected from the group consisting of linear and branched ($C_1$-$C_{20}$)alkyl, ($C_2$-$C_{20}$) alkenyl, and ($C_2$-$C_{20}$)alkinyl.

15. A optical film according to claim 14, wherein at least one of the additional side-groups is connected with the Core via a bridging group A selected from the group consisting of —C(O)—, —C(O)O—, —C(O)—NH—, —(SO$_2$)NH—, —O—, —CH$_2$O—, —NH—, >N—, and any combination thereof.

16. An optical film according to claim 9, wherein the salt of the organic compound of the first type is selected from the group consisting of ammonium and alkali-metal salts.

17. An optical film according to claim 9, further comprising inorganic compounds which are selected from the group consisting of hydroxides and salts of alkali metals.

18. An optical film according to claim 9, wherein said solid retardation layer is generally a biaxial retardation layer possessing two refractive indices ($n_{x,\ and\ ny}$) corresponding to two mutually perpendicular directions in the plane of the substrate front surface and one refractive index ($n_z$) in the normal direction to the substrate front surface, and wherein the refractive indices obey the following condition: $n_x \neq n_z \neq n_y$.

19. An optical film according to claim 18, wherein the refractive indices obey the following condition: $n_z < n_y < n_x$.

20. An optical film according to claim 18, wherein the refractive indices obey the following condition: $n_z < n_x < n_y$.

21. An optical film according to claim 9, wherein the substrate material is selected from the group consisting of a polymer and glass.

22. An optical film according to claim 9, wherein the substrate's front and rear surfaces are flat or curved or any combination thereof.

23. A liquid crystal display comprising a vertical alignment mode liquid crystal cell, two polarizers arranged on each side of the liquid crystal cell, and at least one compensating structure located between said polarizers, wherein the polarizers have transmission axes which are perpendicular to each other, and the compensating structure comprises at least one retardation layer, wherein the retardation layer comprises at least one organic compound of a first type, and at least one organic compound of a second type, wherein the organic compound of the first type has the general structural formula I (I)

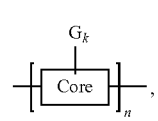

where Core is a conjugated organic unit capable of forming a rigid rod-like macromolecule, n is a number of the conjugated organic units in the rigid rod-like macromolecule, $G_k$ is a set of ionogenic side-groups, and k is a number of the side-groups in the set $G_K$; wherein the ionogenic side-groups and the number k provide solubility of the organic compound of the first type in a solvent and give rigidity to the rod-like macromolecule; the number n provides molecule anisotropy that promotes self-assembling of macromolecules in a solution of the organic compound or its salt, wherein the number k is equal to 0, 1, 2, 3, 4, 5, 6, 7, or 8, and the number n is an integer in the range from 10 to 10000;

wherein the rod-like macromolecule has a polymeric main rigid-chain, wherein at least one rigid-core polymer is a copolymer having the general structural formula IV

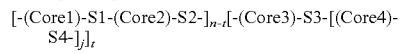

(IV)

wherein Core1, Core2, Core3 and Core4 are conjugated organic components, spacers S1, S2, S3 and S4 are selected independently from the group consisting of —CO—NH—, —NH—CO—, —O—NH—, linear and branched ($C_1$-$C_4$)alkylenes, linear and branched ($C_1$-$C_4$)alkenylenes, ($C_2$-$C_{20}$)polyethylene glycols, —O—CH$_2$—, —CH$_2$—O—, —CH=CH—, —CH=CH—COO—, —OOC—CH=CH—, —CO—CH$_2$—, —OCO—O—, —OCO—, —C≡C—, —CO—S—, —S—, —S—CO—, —O—, —NH—, N(CH$_3$)—, n is an integer in the range from 10 to 10000, t is an integer in the range from 1 to n-1 and j is 0 or 1, and wherein the conjugated organic component Core3 differs from Core1 or Core 2, or Core4 differs from Core1 or Core2;

wherein the conjugated organic components Core1, Core2, Core3 and Core4 comprising ionogenic groups G are selected from the structures based on benzene ring and naphthalene and having general formula 1 to 2:

(1)

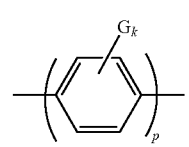

(2)

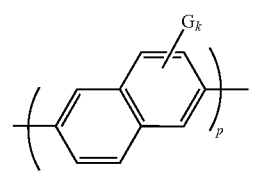

wherein the ionogenic side-groups G are selected from the group consisting of —COOH, —SO$_3$H, and —H$_2$PO$_3$, k is equal 0, 1 or 2, p is equal to 1, 2 or 3; and wherein the organic compound of the second type has the general structural formula II

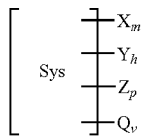
(II)

where Sys is an at least partially conjugated substantially planar cyclic or polycyclic molecular system;

X, Y, Z, and Q are substituents;

substituent X is a carboxylic group —COOH, m is 0, 1, 2, 3 or 4;

substituent Y is a sulfonic group —SO$_3$H, h is 0, 1, 2, 3 or 4;

substituent Z is a carboxamide —CONH$_2$, p is 0, 1, 2, 3 or 4;

substituent Q is a sulfonamide —SO$_2$NH$_2$, v is 0, 1, 2, 3 or 4;

wherein the organic compound of the second type is capable of forming board-like supramolecules via π-π-interaction, and wherein the composition is capable of forming a lyotropic liquid crystal solution, and said solution is capable of forming a solid biaxial retardation layer substantially transparent to electromagnetic radiation in the visible spectral range;

wherein Sys is selected from the structures with general formula 14 to 20:

(14)

(15)

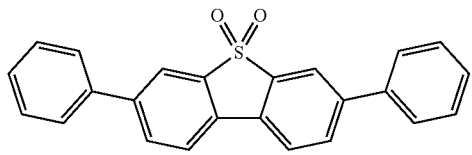

(16)

(17)

(18)

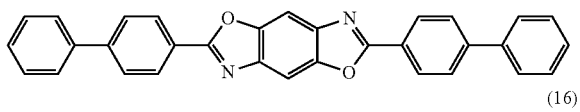

(19)

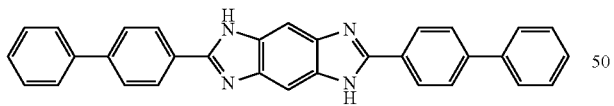

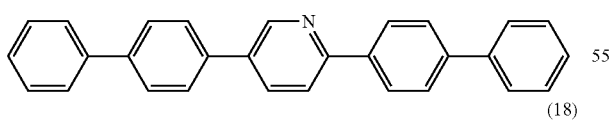

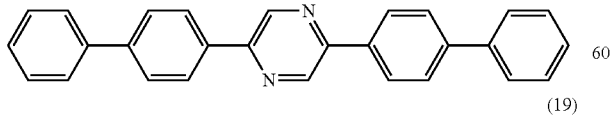

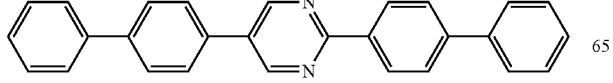

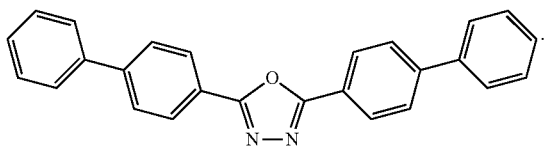
(20)

24. A liquid crystal display according to claim 23, wherein the rod-like macromolecule has a polymeric main rigid-chain, and wherein the conjugated organic units are the same.

25. A liquid crystal display according to claim 23, wherein the rigid rod-like macromolecule has a copolymeric main rigid-chain, and wherein at least one conjugated organic unit is different from others.

26. A liquid crystal display according to claim 23, wherein the organic compound of the first type is selected from structures 3 to 13, wherein the ionogenic side-group G a sulfonic group —SO$_3$H, and k is equal to 0, 1 or 2:

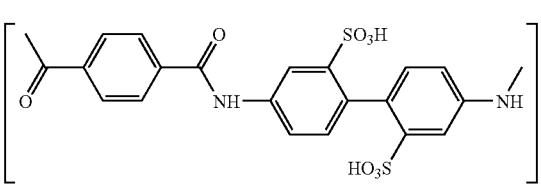
(3)

poly(2,2'-disulfo-4,4'-benzidine terephthalamide)

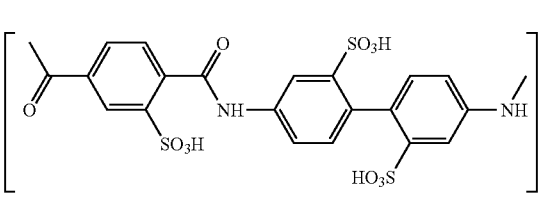
(4)

poly(2,2'-disulfo-4,4'-benzidine sulfoterephthalamide)

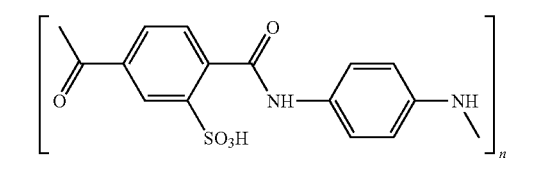
(5)

poly(para-phenylene sulfoterephthalamide)

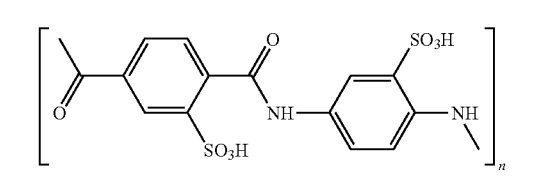
(6)

poly(2-sulfo-1,4-phenylene sulfoterephthalamide)

-continued (7)

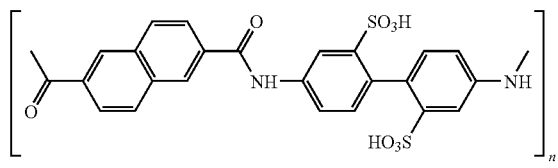

poly(2,2'-disulfo-4,4'-benzidine naphthalene-2,6-dicarboxamide)

(8)

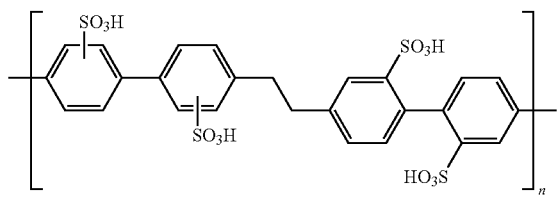

Poly(disulfobiphenylene-1,2-ethylene-2,2'disulfobiphenylene)

(9)

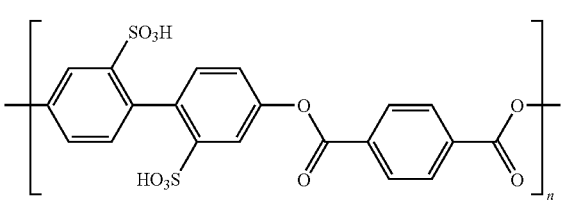

Poly(2,2'-disulfobiphenyl-dioxyterephthaloyl)

(10)

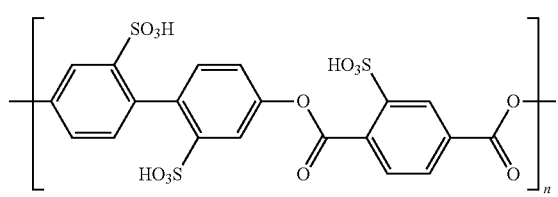

Poly(2,2'-disulfobiphenyl-2-sulfodioxyterephthaloyl)

(11)

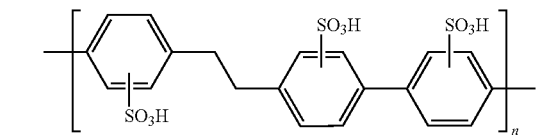

Poly(sulfophenylene-1,2-ethylene-2,2'-disulfobiphenylene)

(12)

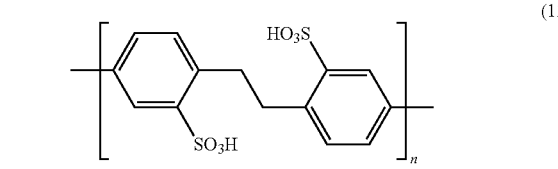

Poly(2-sulfophenylene-1,2-ethylene-2'-sulfophenylene)

-continued (13)

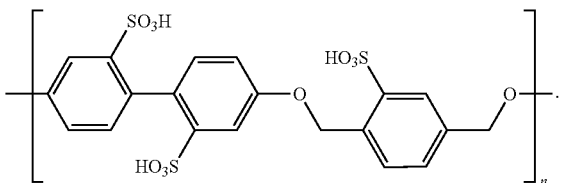

Poly(2,2'-disulfobiphenyl-2-sulfo-1,4-dioxymethylphenylene)

27. A liquid crystal display according to claim 23, wherein the organic compound of the first type further comprises additional side-groups independently selected from the group consisting of linear and branched $(C_1-C_{20})$alkyl, $(C_2-C_{20})$alkenyl, and $(C_2-C_{20})$alkinyl.

28. A liquid crystal display according to claim 27, wherein at least one of the additional side-groups is connected with the Core via a bridging group A selected from the group consisting of —C(O)—, —C(O)O—, —C(O)—NH—, —(SO$_2$)NH—, —O—, —H$_2$O—, —NH—, >N—, and any combination thereof.

29. A liquid crystal display according to claim 23, wherein the salt of the organic compound of the first type is selected from the group consisting of ammonium and alkali-metal salts.

30. A liquid crystal display according to claim 23, further comprising inorganic compounds which are selected from the group consisting of hydroxides and salts of alkali metals.

31. A liquid crystal display according to claim 23, wherein the compensating structure comprises the single retardation layer which is characterized by two in-plane refractive indices (nf and ns) corresponding to a fast principal axis and a slow principal axis respectively, and one refractive index (nn) in the normal direction which obey the following conditions for electromagnetic radiation in the visible spectral range: ns >nf>nn.

32. A liquid crystal display according to claim 23, wherein at least one compensating structure is located between the liquid crystal cell and one of said polarizers.

33. A liquid crystal display according to claim 23, wherein at least one compensating structure is located inside the liquid crystal cell.

34. A liquid crystal display according to claim 23, comprising at least two compensating structures located on each side of the liquid crystal cell.

35. A liquid crystal display according to claim 31, further comprising an additional retardation layer which is characterized by two in-plane refractive indices (nf and ns) corresponding to a fast principal axis and a slow principal axis respectively, and one refractive index (nn) in the normal direction which obey the following conditions for electromagnetic radiation in the visible spectral range: ns=nf>nn.

36. A liquid crystal display according to claim 23, wherein at least one of the two polarizers comprises at least one retardation TAC-layer where TAC is triacetyl cellulose.

* * * * *